United States Patent
Boroujeni et al.

(10) Patent No.: US 10,356,788 B2
(45) Date of Patent: Jul. 16, 2019

(54) SYSTEM AND METHOD FOR HIGH-RATE SPARSE CODE MULTIPLE ACCESS IN DOWNLINK

(71) Applicant: Huawei Technologies Co., Ltd., Shenzhen (CN)

(72) Inventors: Mahmoud Taherzadeh Boroujeni, Ottawa (CA); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 15/365,332

(22) Filed: Nov. 30, 2016

(65) Prior Publication Data

US 2017/0127423 A1    May 4, 2017

Related U.S. Application Data

(63) Continuation of application No. PCT/CN2016/103399, filed on Oct. 26, 2016.
(Continued)

(51) Int. Cl.
H04W 72/04 (2009.01)
H04L 1/00 (2006.01)
H04W 88/02 (2009.01)

(52) U.S. Cl.
CPC ......... H04W 72/0466 (2013.01); H04L 1/00 (2013.01); H04L 1/004 (2013.01); H04W 88/02 (2013.01)

(58) Field of Classification Search
None
See application file for complete search history.

(56) References Cited

U.S. PATENT DOCUMENTS 6,434,133 B1    8/2002   Hamalainen
7,535,975 B1    5/2009   ten Brink et al.
(Continued)

FOREIGN PATENT DOCUMENTS

CN    101414898 A    4/2009
CN    101860386 A    10/2010
(Continued)

OTHER PUBLICATIONS

Al-Imari, et al., "Low Density Spreading for next generation multicarrier cellular systems," 2012 International Conference on Future Communication Networks (ICFCN), pp. 52-57, Apr. 2-5, 2012.
(Continued)

*Primary Examiner* — Rebecca E Song
(74) *Attorney, Agent, or Firm* — Slater Matsil, LLP

(57) ABSTRACT

Higher rates of data communication may be utilized for downlink than for uplink. However, the decoding complexity of Sparse Code Multiple Access (SCMA) may become prohibitive for very high rates, resulting from, for example, a large number of layers, for very large constellations, or a combination of the two. Methods and transmitters are provided herein for transmitting that has been generated to reduce complexity at the receiver and methods and receivers are provided herein for receiving and decoding a received signal with reduced complexity. The reduced complexity in part is provided by the ability to maintain real and imaginary parts of a transmitted signal independent from one another.

57 Claims, 20 Drawing Sheets

Related U.S. Application Data

(60) Provisional application No. 62/248,734, filed on Oct. 30, 2015.

(56) References Cited

U.S. PATENT DOCUMENTS

| | | | |
|---|---|---|---|
| 7,583,747 | B1 | 9/2009 | Damen et al. |
| 7,657,429 | B2 | 2/2010 | Tsushima |
| 8,125,884 | B1 | 2/2012 | Li et al. |
| 8,219,873 | B1 | 7/2012 | Ng et al. |
| 8,245,092 | B2 | 8/2012 | Kotecha et al. |
| 8,705,574 | B2 | 4/2014 | Hammarwall et al. |
| 8,719,654 | B2 | 5/2014 | Kotecha et al. |
| 8,737,509 | B2 | 5/2014 | Yu et al. |
| RE45,230 | E | 11/2014 | Giannakis et al. |
| 2002/0126773 | A1 | 9/2002 | Brunel |
| 2003/0039321 | A1 | 2/2003 | Lee et al. |
| 2004/0052306 | A1* | 3/2004 | Ibrahim ............... H04B 1/7093 375/152 |
| 2005/0220203 | A1 | 10/2005 | Ojard |
| 2005/0286663 | A1 | 12/2005 | Poon |
| 2006/0159195 | A1 | 7/2006 | Ionescu et al. |
| 2009/0046011 | A1* | 2/2009 | Tung ................... H04B 7/0417 342/377 |
| 2009/0097582 | A1 | 4/2009 | Barsoum et al. |
| 2009/0196379 | A1 | 8/2009 | Gan et al. |
| 2009/0285122 | A1 | 11/2009 | Onggosanusi et al. |
| 2009/0285332 | A1 | 11/2009 | Damen et al. |
| 2010/0115358 | A1 | 5/2010 | Kotecha et al. |
| 2010/0239040 | A1 | 9/2010 | Beluri et al. |
| 2011/0044400 | A1 | 2/2011 | Collings et al. |
| 2011/0135020 | A1 | 6/2011 | Au-Yeung et al. |
| 2011/0170625 | A1 | 7/2011 | Blankenship et al. |
| 2011/0222627 | A1 | 9/2011 | Prakash et al. |
| 2011/0261894 | A1 | 10/2011 | Yu et al. |
| 2011/0274123 | A1 | 11/2011 | Hammarwall et al. |
| 2012/0027113 | A1 | 2/2012 | Gaal et al. |
| 2012/0039369 | A1 | 2/2012 | Choi et al. |
| 2012/0039402 | A1 | 2/2012 | Clerckx et al. |
| 2012/0057646 | A1 | 3/2012 | Jovicic et al. |
| 2012/0136912 | A1 | 5/2012 | Kim et al. |
| 2012/0177011 | A1 | 7/2012 | Xi et al. |
| 2012/0183020 | A1 | 7/2012 | Koike-Akino et al. |
| 2012/0224554 | A1 | 9/2012 | Park |
| 2012/0294382 | A1 | 11/2012 | Wang et al. |
| 2012/0300711 | A1 | 11/2012 | Wang et al. |
| 2013/0036338 | A1 | 2/2013 | Kotecha et al. |
| 2013/0094468 | A1 | 4/2013 | Ko et al. |
| 2013/0121437 | A1 | 5/2013 | Wang et al. |
| 2013/0182791 | A1 | 7/2013 | Dhakal et al. |
| 2013/0188751 | A1 | 7/2013 | Ohlmer et al. |
| 2013/0237261 | A1 | 9/2013 | Bazzi et al. |
| 2013/0251058 | A1 | 9/2013 | Wu |
| 2014/0140289 | A1 | 5/2014 | Moulsley |
| 2014/0140360 | A1* | 5/2014 | Nikopour ............... H04J 13/00 370/479 |
| 2014/0226742 | A1 | 8/2014 | Yu et al. |
| 2014/0245094 | A1 | 8/2014 | Kotecha et al. |
| 2015/0256243 | A1 | 9/2015 | Wang et al. |
| 2015/0295629 | A1 | 10/2015 | Xia et al. |
| 2016/0043783 | A1 | 2/2016 | Xia et al. |
| 2016/0156498 | A1* | 6/2016 | Loghin ................ H04L 1/0042 375/298 |

FOREIGN PATENT DOCUMENTS

| | | |
|---|---|---|
| CN | 102130752 A | 7/2011 |
| CN | 102232319 A | 11/2011 |
| CN | 102439866 A | 5/2012 |
| CN | 103262453 A | 8/2013 |
| CN | 104798317 A | 7/2015 |
| EP | 2429083 A1 | 3/2012 |
| KR | 20130037429 A | 4/2013 |
| WO | 2006007148 A1 | 1/2006 |
| WO | 2007035993 A1 | 4/2007 |
| WO | 2010102435 A1 | 9/2010 |
| WO | 2012048218 A1 | 4/2012 |
| WO | 2014075637 A1 | 5/2014 |
| WO | 2014201988 A1 | 12/2014 |
| WO | 2015149668 A1 | 10/2015 |

OTHER PUBLICATIONS

Beko, M., et al., "Designing Good Multi-Dimensional Constellations," IEEE Wireless Communications Letters, vol. 1, No. 3, Jun. 2012, pp. 221-224.

Burr, A. G., "Capacity improvement of CDMA systems using M-ary code shift keying," in Mobile Radio and Personal Communications, Sixth International Conference on Mobile Radio and Personal Communications, Dec. 9-11, 1991, pp. 63-67.

Forney, Jr., D. G., "Coset Codes—Part II: Binary Lattices and Related Codes," IEEE Transactions on Information Theory, vol. 34, No. 5, Sep. 1988, 1152-1187.

Forney, Jr., D. G., "Coset Codes—Part I: Introduction and Geometrical Classification," IEEE Transaction on Information Theory, vol. 34, No. 5, Sep. 1988, pp. 1123-1151.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

Zhang et al., "A Survey on 5G New Waveform," From Energy Efficiency Aspects.

Boutros, J., et al., "Signal Space Diversity: A Power-and Bandwidth-Efficient Diversity Technique for the Rayleigh Fading Channel," IEEE Transactions on Information Theory, vol. 44, No. 4, Jul. 1998, pp. 1453-1467.

Boutros, J., et al., "Good Lattice Constellatins for Both Rayleigh Fading and Gaussian Channels," IEEE Transactions on Information Theory, vol. 42, No. 2, Mar. 1996, pp. 502-518.

Viterbo, E., et al., "A Universal Lattice Code Decoder for Fading Channels," IEEE Transactions on Information Theory, vol. 45, No. 5, Jul. 1999, pp. 1639-1642.

Prasad, R., et al., "An Overview of Multi-carrier CDMA," IEEE 4th International Symposium on Spread Spectrum Techniques and Applications Proceedings, Sep. 22-25, 1996, pp. 107-114.

Schotten, H. D., et al., "Adaptive Multi-Rate Multi-Code CDMA Systems," 48th IEEE Vehicular Technology Conference, May 18-21, 1998. vol. 2, pp. 782-785.

Tran, N.H., et al., "Multidimensional Subcarrier Mapping for Bit-Interleaved Coded OFDM With Iterative Decoding", IEEE Transactions on Signal Processing, Dec. 2007, pp. 5772-5781, vol. 55, No. 12.

Van De Beek, J., et al., "Multiple Access with Low-Density Signatures," Huawei Technologies Sweden, IEEE Globecom, 2009 proceedings, 6 pages.

* cited by examiner

US 10,356,788 B2

SYSTEM AND METHOD FOR HIGH-RATE SPARSE CODE MULTIPLE ACCESS IN DOWNLINK

CROSS-REFERENCE TO RELATED APPLICATIONS

This application is a continuation of PCT Application No. PCT/CN2016/103399, filed on Oct. 26, 2016, which claims the benefit of U.S. Provisional Application No. 62/248,734, filed on Oct. 30, 2015, which applications are hereby incorporated herein by reference.

TECHNICAL FIELD

This application relates to wireless communication, and more particularly to a system and method for utilizing Sparse Code Multiple Access.

BACKGROUND

Code Division Multiple Access (CDMA) is a multiple access technique in which data symbols are spread over orthogonal code sequences or near orthogonal code sequences, or a combination of both. Conventional CDMA encoding is a two-step process in which a binary code is mapped to a Quadrature Amplitude Modulation (QAM) symbol before a spreading sequence is applied. Although conventional CDMA encoding can provide relatively high coding rates, new techniques/mechanisms for achieving even higher coding rates are needed to meet the ever-growing demands of next-generation wireless networks. Low Density Spreading (LDS) is a form of CDMA used for multiplexing different layers of data. LDS uses repetitions of the same symbol on specific layers at nonzero locations in a time/frequency resource. As an example, in LDS-Orthogonal Frequency Division Multiplexing (OFDM) a constellation point is repeated over nonzero frequency tones of a LDS block. In Sparse Code Multiple Access (SCMA), a multi-dimensional codebook is used to spread data over tones without necessarily repeating symbols.

The decoding complexity of SCMA may become prohibitive for very high rates, resulting from, for example, a large number of layers, very large constellations, or a combination of the two.

SUMMARY

According to an embodiment of the disclosure, there is provided a method for transmission of a multiple access signal. The method involves modulating a first data stream using a codebook to produce a second data stream. The codebook includes a plurality of codewords. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation in which real and imaginary components of the constellation point are independent of one another. The real and imaginary components of the constellation represent non-overlapping subsets of coded bits but not necessarily information bits in the first data stream. A further step of the method involves transmitting the second data stream.

In some embodiments, each of the N non-zero values of a respective codeword includes a projection on one of N complex constellations, the N complex constellations being an alternative representative of the N-dimensional complex constellation, in which a number of possible projections on the N complex constellations is less than a number of points of the N-dimensional complex constellation.

In some embodiments, the projection of each N complex constellation is mapped to an associated non-zero transmission resource using a signature specific to the first data stream.

In some embodiments, the signature has a same phase for mapping to all of the plurality of transmission resources.

In some embodiments, when multiple first data streams are each modulated with a codebook that is specific to a respective first data stream to produce the second data stream, each of the N non-zero transmission resources are mapped to using a signature specific to the respective first data stream, wherein the respective signatures for each of the first data streams have a same phase.

In some embodiments, wherein each of the N complex constellations includes a plurality of projections, each projection defined by a complex plane coordinate pair having a real component coordinate and an imaginary component coordinate and having an associated label, the real component coordinate of a projection on an nth complex constellation, n=1 to N, is mapped from an nth axis component of a point on a first N-dimensional lattice constellation and the imaginary component coordinate of the projection on the nth complex constellation is mapped from an nth axis component of a point on a second N-dimensional lattice constellation, and the label of the projection of the nth complex constellation is a combination of a label of the point on the first N-dimensional lattice constellation and a label of the point on the second N-dimensional lattice constellation.

In some embodiments, the first and second N-dimensional lattice constellations are an output of unitary rotation performed on respective lattice constellations, the unitary rotation selected to reduce a number of constellation projections per dimension in the N-dimensional complex constellation.

In some embodiments, the first and second N-dimensional lattice constellations are an output for which no unitary rotation is performed.

In some embodiments, the codebook includes a sparse code multiple access (SCMA) codebook.

In some embodiments, the number of points in the N-dimensional complex constellation is equal to or greater than 16.

In some embodiments, the number of points in the N-dimensional complex constellations is one of 16, 64, 256 or 1024.

In some embodiments, the codebook is used for downlink transmission.

In some embodiments, the first data stream includes a stream of bits, and the second data stream includes a stream of symbols.

In some embodiments, the modulating the first data stream using a codebook to produce the second data stream further includes the layer specific signature applying a change of power level to values of the N non-zero transmission resources.

According to an embodiment of the disclosure, there is provided a device for transmitting a multiple access signal. The device includes a processor configured to modulate a first data stream using a codebook to produce a second data stream. The codebook includes a plurality of codewords. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation in which real and imaginary components of the constellation point are independent of one another. The device also includes a transmitter, operatively coupled to the processor, and configured to transmit the second data stream over allocated resources.

In some embodiments, each of the N non-zero values of a respective codeword includes a projection on one of N complex constellations, the N complex constellations being an alternative representative of the N-dimensional complex constellation, in which a number of possible projections on the N complex constellations is less than a number of points of the N-dimensional complex constellation.

In some embodiments, the projection of each N complex constellation is mapped to an associated non-zero transmission resource using a signature specific to the first data stream.

In some embodiments, the signature has a same phase for mapping to all of the plurality of transmission resources.

In some embodiments, when multiple first data streams are each modulated with a codebook that is specific to a respective first data stream to produce the second data stream, each of the N non-zero transmission resources are mapped to using a signature specific to the respective first data stream, wherein the respective signatures for each of the first data streams have a same phase.

In some embodiments, each of the N complex constellations includes a plurality of projections, each projection defined by a complex plane coordinate pair, having a real component coordinate and an imaginary component coordinate and having an associated label, the real component coordinate of a point on an nth complex mother constellation, n=1 to N, is mapped from an nth axis component of a point on a first N-dimensional lattice constellation and the imaginary component coordinate of the projection on the nth complex mother constellation is mapped from an nth axis component of a point on a second N-dimensional lattice constellation, and the label of the projection of the nth complex mother constellation is a combination of a label of the point on the first N-dimensional lattice constellation and a label of the point on the second N-dimensional lattice constellation.

In some embodiments, the codebook is used for downlink transmission.

In some embodiments, the modulating the first data stream using a codebook to produce the second data stream further includes the layer specific signature applying a change of power level to values of the N non-zero transmission resources.

In some embodiments, the device further includes a computer readable medium for storing one or more of one or more codebooks, one or more complex mother constellations and one or more layer specific signatures.

In some embodiments, the processor is configured to generate one or more codebooks.

According to an embodiment of the disclosure, there is provided a method for receiving a multiple access signal. The method involves receiving a first data stream including a first codeword belonging to a first codebook of a plurality of codebooks. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation in which real and imaginary components of the constellation point are independent of one another. The method also involves decoding the first codeword using two message passing algorithm (MPA) decoders and a forward error correcting (FEC) decoder. One MPA decoder is used for soft-decoding real components of the N complex constellations and one MPA decoder is used for soft-decoding imaginary components of the N complex constellations. The two MPA decoders provide soft-decoded outputs to the FEC decoder to decode the first data stream.

In some embodiments, each of the N non-zero values of a respective codeword includes a projection on one of N complex constellations, the N complex constellations being an alternative representative of the N-dimensional complex constellation, in which a number of possible projections on the N complex constellations is less than a number of points of the N-dimensional complex constellation.

In some embodiments, the method further includes compensating for effects of a channel by applying a conjugate of an estimate channel gain to the first data stream.

According to an embodiment of the disclosure, there is provided a receiving device. The device includes a receiver that is operatively coupled to a processor. The receiver is configured to receive a first data stream over allocated resources in the communication system. The processor is configured to decode a first codeword within the first data stream. The first codeword belongs to a first codebook of a plurality of codebooks. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation in which real and imaginary components of the constellation point are independent of one another. Each of the N non-zero values of a respective codeword includes a projection on one of N complex constellations, the N complex constellations representative of the N-dimensional complex constellation, in which the number of projections on the N complex constellations is less than the number of points of the N-dimensional complex constellation.

In some embodiments, the processor is configured to decode the first codeword using two message passing algorithm (MPA) decoders and a forward error correcting (FEC) decoder, one MPA decoder for soft-decoding real components of the N complex constellations and one MPA decoder for soft-decoding imaginary components of the N complex constellations, the two MPA decoders configured to provide soft-decoded outputs to the FEC decoder to decode the first data stream.

According to an embodiment of the disclosure, there is provided a processor that is configured to apply a conjugate of a channel gain to a received signal to align with the real and imaginary components of the transmitted signal. The processor is also configured to separate the real and imaginary components of the received signal. The device is also configured to decode the real and imaginary components of the received signal independently to recover originally transmitted bits.

In some embodiments, the real and imaginary components are decoded independently using two separate decoding algorithms.

According to an embodiment of the disclosure, there is provided a method for transmission of a multiple access signal. The method involves modulating a first data stream using a codebook to produce a second data stream. The codebook includes a plurality of codewords. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation. Each of the N non-zero values of a respective codeword includes a projection on one of N complex constellations, the N complex constellations being an alternative representative of the N-dimensional complex constellation, in which a number of possible projections on the N complex constellations is less than a number of points of the N-dimensional complex constellation. The method also involves transmitting the second data stream.

In some embodiments, real and imaginary components of the constellation point of the N-dimensional complex constellation are independent of one another.

In some embodiments, the projection of each N complex constellation is mapped to an associated non-zero transmission resource using a signature specific to the first data stream.

In some embodiments, the signature has a same phase for mapping to all of the plurality of transmission resources.

In some embodiments, when multiple first data streams are each modulated with a codebook that is specific to a respective first data stream to produce a second data stream, each of the N non-zero transmission resources are mapped to using a signature specific to the respective first data stream, wherein the respective signatures for each of the first data streams have a same phase.

According to an embodiment of the disclosure, there is provided a method for transmission of a multiple access signal. The method involves modulating a first data stream using a codebook to produce a second data stream. The codebook includes a plurality of codewords. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation. When multiple first data streams are each modulated with a codebook that is specific to a respective first data stream to produce a second data stream, each of the N non-zero transmission resources are mapped to using a signature specific to the respective first data stream, wherein the respective signatures for each of the first data streams have a same phase. A further step of the method involves transmitting the second data stream.

In some embodiments, real and imaginary components of the constellation point of the N-dimensional complex constellation are independent of one another.

In some embodiments, each of the N non-zero values of a respective codeword include a projection on one of N complex constellations, the N complex constellations being an alternative representative of the N-dimensional complex constellation, in which a number of possible projections on the N complex constellations is less than a number of points of the N-dimensional complex constellation.

According to an embodiment of the disclosure, there is provided a method for transmission of a multiple access signal. The method involves modulating a first data stream using a codebook to produce a second data stream. The codebook includes a plurality of codewords. Each codeword of the codebook is configured to map a portion of the first data stream to a plurality of transmission resources in which N of the plurality of transmission resources, N≥2, are each encoded with a non-zero value and a remainder of the plurality of transmission resources are each assigned a zero value. Each codeword represents a constellation point of an N-dimensional complex constellation, the constellation point of the N-dimensional complex constellation being equivalent to points of N QAM constellations mapped independently to the N non-zero transmission resources.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIG. 1A illustrates a first device according to example embodiments described herein;

DETAILED DESCRIPTION OF ILLUSTRATIVE EMBODIMENTS

Figure 1A:
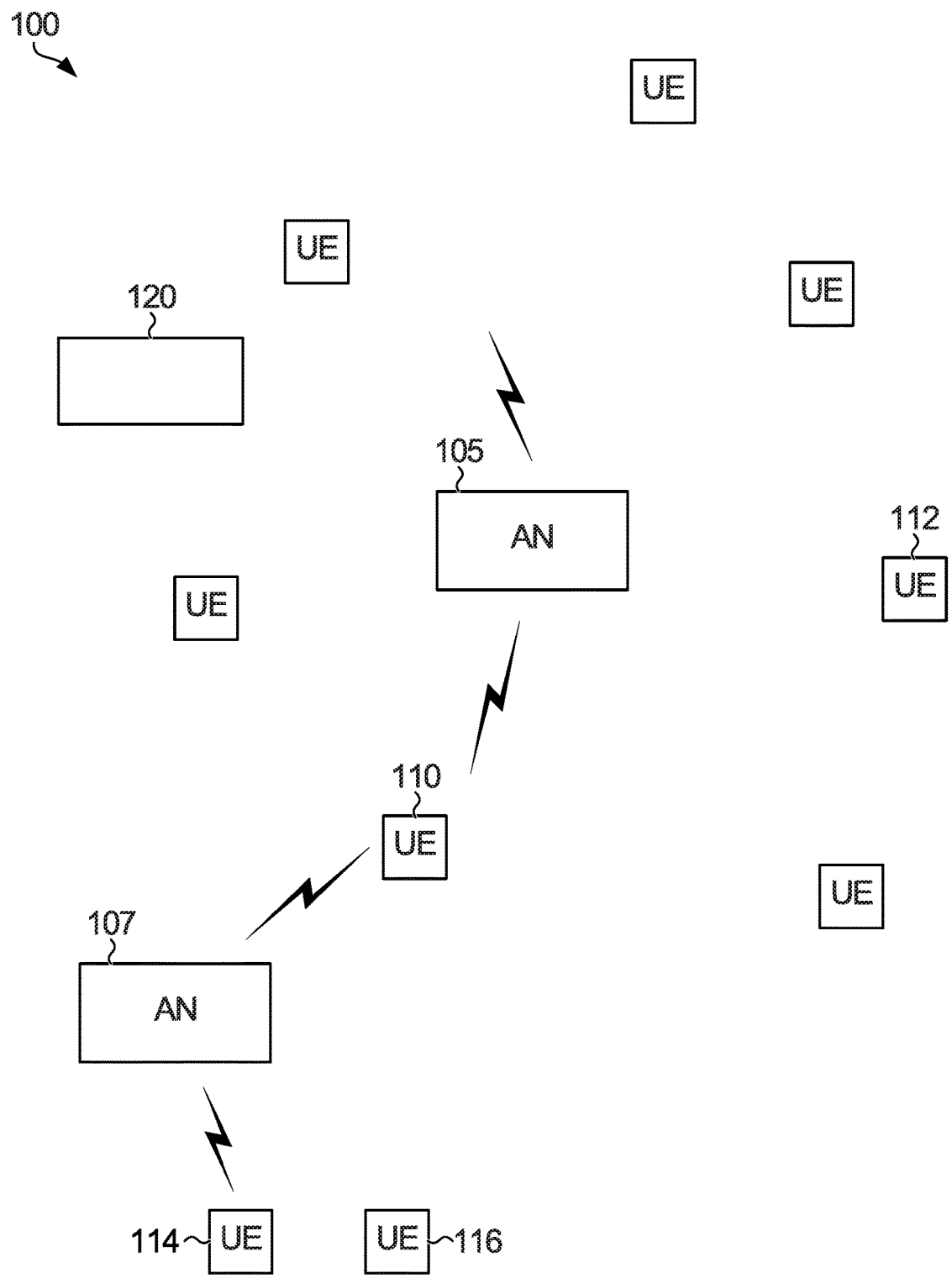
FIG. 1A illustrates an example communications system having communication nodes that may operate according to example embodiments described herein.

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

The present disclosure will be described with respect to example embodiments in a specific context, namely a communications system that uses SCMA to provide high data rates to meet demands for greater data traffic. The disclosure may be applied to standards compliant communications systems, such as those that are compliant with Third Generation Partnership Project (3GPP), IEEE 802.11, and the like, technical standards, and non-standards compliant communications systems, that use codebooks with large numbers of projections in downlink communications.

SCMA is an encoding technique that encodes data streams into codewords over multiple resource elements. SCMA may directly encode the data stream into multidimensional codewords instead of using an intermediate quadrature amplitude modulation (QAM) symbol mapping. This may lead to coding gain over conventional CDMA encoding. SCMA encoding techniques transmit data streams using multidimensional codewords rather than QAM symbols.

Additionally, SCMA encoding provides multiple access through the use of different codebooks for different multiplexed layers, as opposed to the use of different spreading sequences for different multiplexed layers. Furthermore, because SCMA encoding typically uses codebooks with sparse codewords, receivers can use low complexity algorithms, such as Message Passing Algorithm (MPA), to detect respective codewords at the receiver.

SCMA codebooks can be used for uplink, i.e., transmission in a direction from one or more user equipment (UE) to a base station. For downlink, i.e., transmission in a direction from a base station to one or more UE, higher data rates may be desired to provide adequate coverage to multiple UEs with acceptable data rates. One way to enable higher data rates is to use constellations with a larger number of points. A larger number of points in a constellation has the drawback of increasing complexity at the receiver side to decode the constellation. It is therefore desired to reduce the complexity of the processing operations performed at the receiver. One way is by maintaining the number of points in a constellation, but overlapping the points onto a lesser number of projections, as will be described below. One way of overlapping the points onto a lesser number of projections is to perform a rotation of N-dimensional lattice constellations that is a starting point for generating at least one mother complex constellation. A mother constellation is an interim representation of a multi-dimensional constellation used in generating a codeword. This allows a distance function of points in the at least one mother constellation to be optimized (maximized or minimized) while maintaining a Euclidian distance of the N-dimensional complex constellation.

According to embodiments of the present application, another manner of increasing the number of points in the complex constellations without a corresponding increase in the complexity of the decoding process includes using all real signatures and separate detection of real and imaginary parts of the received signal. In some embodiments, this includes operators in a layer specific signature used to permute one or more complex mother constellations having a same phase value. The layer specific signature includes one or more operators that, when multiplied by one or more complex mother constellations, generate one or more codewords for a specific layer. The layer specific signature may be considered real valued when the phase values are the same for all operators.

A further manner of reducing the complexity of the decoding process is sending independent QAM points over a subset of entries of each codebook, i.e. points of N QAM constellations mapped independently to N non-zero transmission resources, where N≥2. These subset of entries correspond to a non-zero value on a respective transmission resources, while other entries in the codebook correspond to a zero value on other transmission resources.

Particular embodiments of the present application use complex constellations with a larger number of points, such as 64, 256, or 1024, with a relatively low complexity for decoding at the receiver based on the manner in which the constellations are generated.

FIG. 1A illustrates an example communications network 100. Communications network 100 includes a plurality of access points (APs) 105 and 107, which serve a plurality of user equipments (UEs), such as UE 110, 112, 114 and 116. An access point may also be referred to as a base station, an evolved NodeB (eNodeB or eNB), a transmit point (TP), a receive point (RP), a transmit and receive point (TRP), and the like. A UE may also be referred to as a mobile device, a mobile station, a terminal, and the like. In general, an AP may have multiple transmit antennas, allowing it to transmit to multiple UEs, to transmit multiple layers to a single UE, or a combination thereof. Furthermore, a first AP 105 may transmit to a UE 110 that is also receiving a transmission from a second UE 107. The devices (e.g., APs 105 and 107, and UEs 110, 112, 114 and 116) may communicate using SCMA or any other suitable multiple access scheme.

Although it is understood that communications systems may employ multiple APs capable of communicating with a number of UEs, only two APs, and nine UEs are illustrated for simplicity.

SCMA-OFDM is a code-domain multiplexing scheme over multicarrier modulation in which the spreading codebooks are sparse and hence detection can be made simpler. Spreading factor, sparsity of codebooks, and a number of maximum SCMA multiplexed layers are several examples of communications system parameters, in combination or separately, indicating the flexibility of the SCMA scheme.

Communications system 100 may also include a device 120 that may be used to generate codebooks for use by APs and UEs in communications system 100. In general, the codebooks may be used by transmitting devices and receiving devices. Device 120 may generate a plurality of codebooks, which could be assigned to different layers. Device 120 may provide the plurality of codebooks to the APs in communications system 100, which may, in turn, provide the plurality of codebooks to UEs as the UEs associate with communications system 100. Alternatively, device 120 may save the plurality of codebooks to a storage device, for example a centralized database or a remote disk drive. The plurality of codebooks may be retrieved from the storage device as needed by the APs and UEs.

Figure 1B:
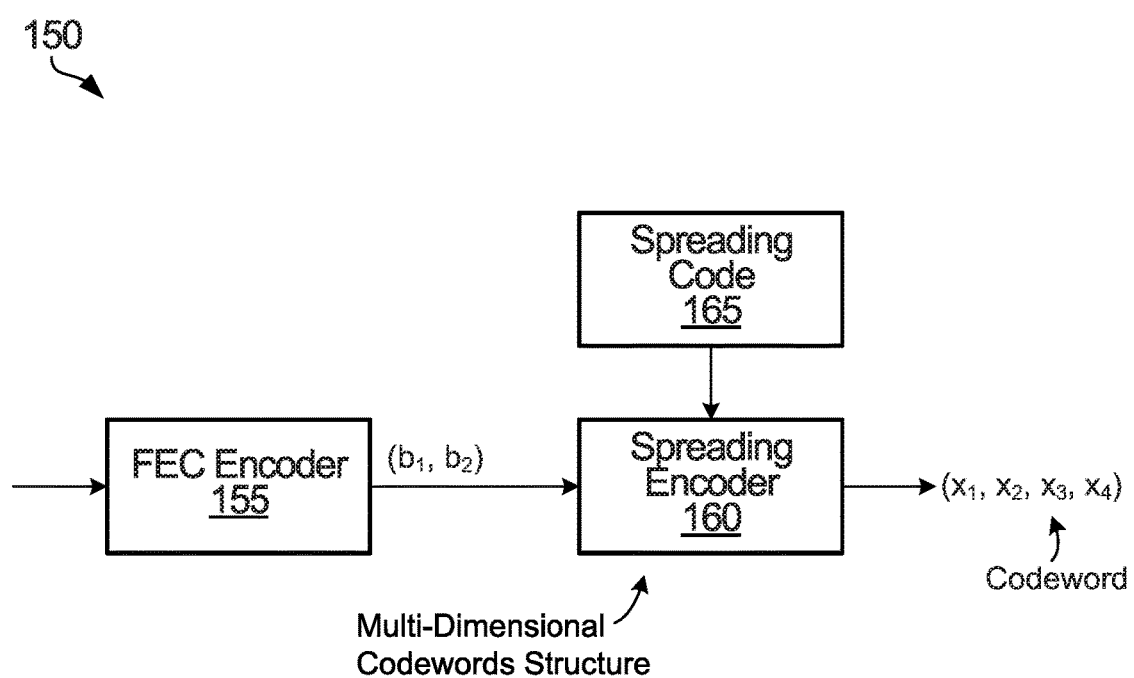
FIG. 1B illustrates an example SCMA encoder for encoding data according to example embodiments described herein.

FIG. 1B illustrates an example SCMA encoder 150 for encoding data. SCMA encoder 150 includes a Forward Error Correction (FEC) encoder 155 and a spreading encoder 160. The FEC encoder 155 encodes a data stream and outputs pairs of binary encoded bits (b1,b2). The binary encoded bits from the FEC encoder 155 are input to the spreading encoder 160, which, in conjunction with a spreading code 165, maps the binary encoded bits to a multidimensional codeword (x1, x2, x3, x4). The SCMA encoder 150 shown in FIG. 1B is configured to encode and map a single layer stream of bits. Multiple layers could be multiplexed using multiple SCMA encoders, one for each layer. Using different spreading codes 165 for different layers results in different codewords. The multiplexed layers may be transmitted over different shared transmission resources of a communications system. Multiplexed layers may comprise at least one of multiple input, multiple output (MIMO) spatial layers, orthogonal frequency division multiple access (OFDMA) tones and time division multiple access (TDMA) layers.

Figure 2:
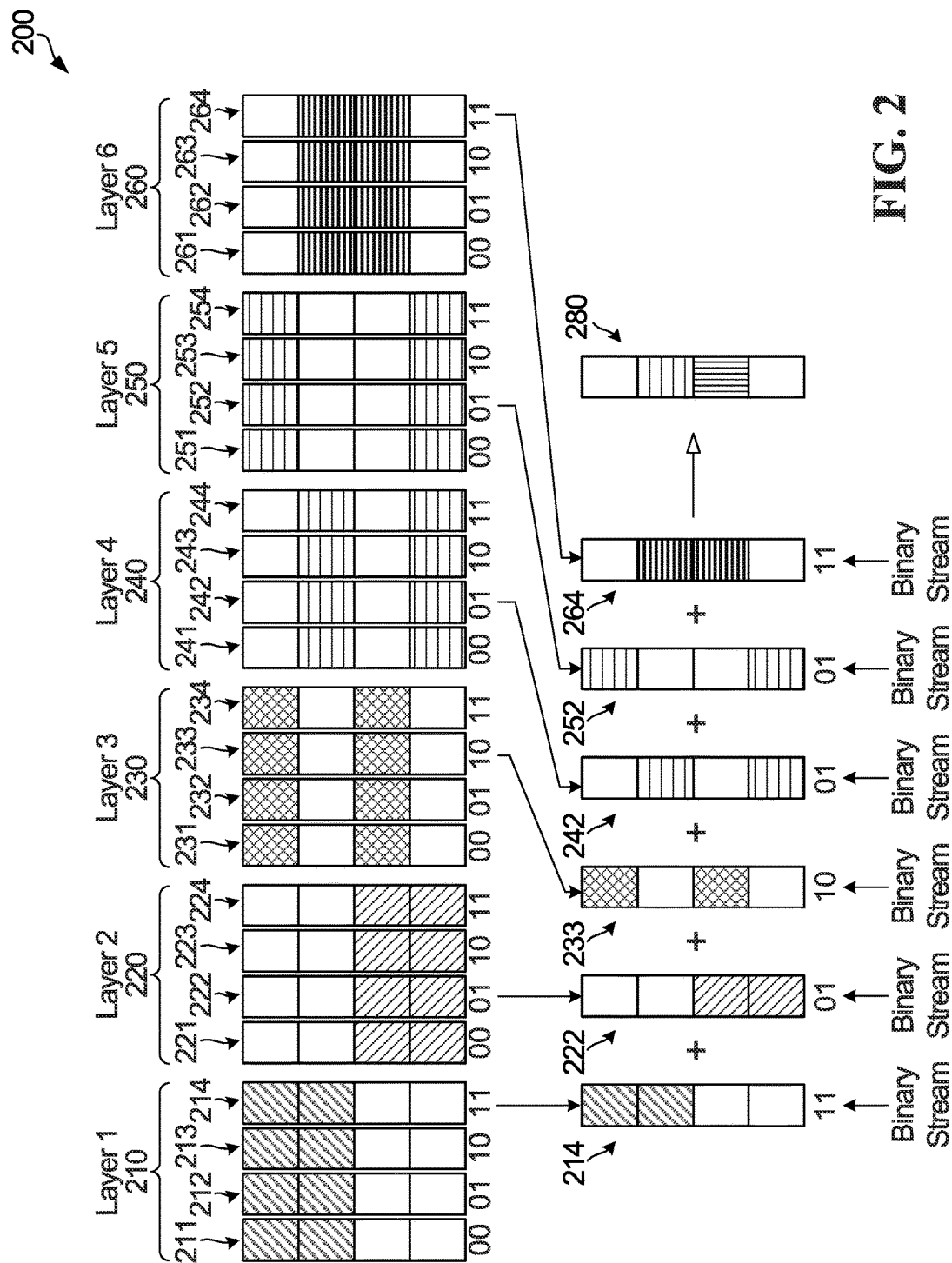
FIG. 2 illustrates an example SCMA multiplexing scheme for encoding data according to example embodiments described herein.

FIG. 2 illustrates an example SCMA multiplexing scheme 200 for encoding data. As shown in FIG. 2, SCMA multiplexing scheme 200 may utilize a variety of codebooks, such as first codebook 210, second codebook 220, third codebook 230, fourth codebook 240, fifth codebook 250, and sixth codebook 260. Each codebook of the variety of codebooks is assigned to a different multiplexed layer. Each codebook includes a plurality of multidimensional codewords. Each codeword is represented by four blocks. Each block represents a transmission resource. Each codeword includes two non-zero blocks (the cross-hatched blocks) and two empty blocks. The non-zero blocks include SCMA encoded data. The combination of non-zero blocks and empty blocks results in a sparsity pattern. In FIG. 2, each codebook has a particular arrangement of non-zero and empty blocks. The SCMA encoded bits are mapped to the non-zero blocks to generate each respective codeword in the codebook. More specifically, first codebook 210 includes codewords 211, 212, 213 and 214; second codebook 220 includes codewords 221, 222, 223 and 224; third codebook 230 includes codewords 231, 232, 233 and 234; fourth codebook 240 includes codewords 241, 242, 243 and 244; fifth codebook 250 includes codewords 251, 252, 253 and 254; and sixth codebook 260 includes codewords 261, 262, 263 and 264.

Each codeword of a respective codebook may be mapped to a different respective value. As an illustrative example, codewords 211, 221, 231, 241, 251, and 261 are mapped to '00', the codewords 212, 222, 232, 242, 252, and 262 are mapped to '01', the codewords 213, 223, 233, 243, 253, and 263 are mapped to '10', and the codewords 214, 224, 234, 244, 254, and 264 are mapped to '11'. It is noted that although the codebooks in FIG. 2 are depicted as having four codewords each, SCMA codebooks in general may have any number of codewords. As an example, SCMA codebooks may have 8 codewords (e.g., mapped to '000' . . . '111'), 16 codewords (e.g., mapped to '0000' . . . '1111'), or more.

FIG. 2 represents codewords from each of the six layers being multiplexed. Data from each layer is encoded using a particular codeword and then the codewords are multiplexed together. In FIG. 2, codeword 214 from the first codebook 210 is the codeword corresponding to the value '11' being transmitted over the first multiplexed layer, codeword 222 from the second codebook 220 is the codeword corresponding to the value '01' being transmitted over the second multiplexed layer, codeword 233 from the third codebook 230 is the codeword corresponding to the value '10' being transmitted over the third multiplexed layer, codeword 242 from the fourth codebook 240 is representative of the value '01' being transmitted over the fourth multiplexed layer, codeword 252 from the fifth codebook 250 is the codeword corresponding to the value '01' being transmitted over the fifth multiplexed layer, and codeword 264 from the sixth codebook 260 is the codeword corresponding to the value '11' being transmitted over the sixth multiplexed layer. Codewords 214, 222, 233, 242, 252, and 264 are then combined together to form multiplexed data stream 280. The shared transmission resources may include a time resource, a frequency resource, a space resource or some combination thereof. Codewords 214, 222, 233, 242, 252, and 264 are sparse codewords, because information is spread over some, but not all, of the transmission resources, i.e., some transmission resources have a zero value and other transmission resources have a non-zero value.

SCMA supports overloading where data for multiple UEs is combined to increase overall data rate and connectivity. The sparsity present in the SCMA codewords reduces complexity of detection. Multi-dimensional codewords allow for shaping gain and better spectral efficiency with spreading for robust link adaption.

Figure 3:
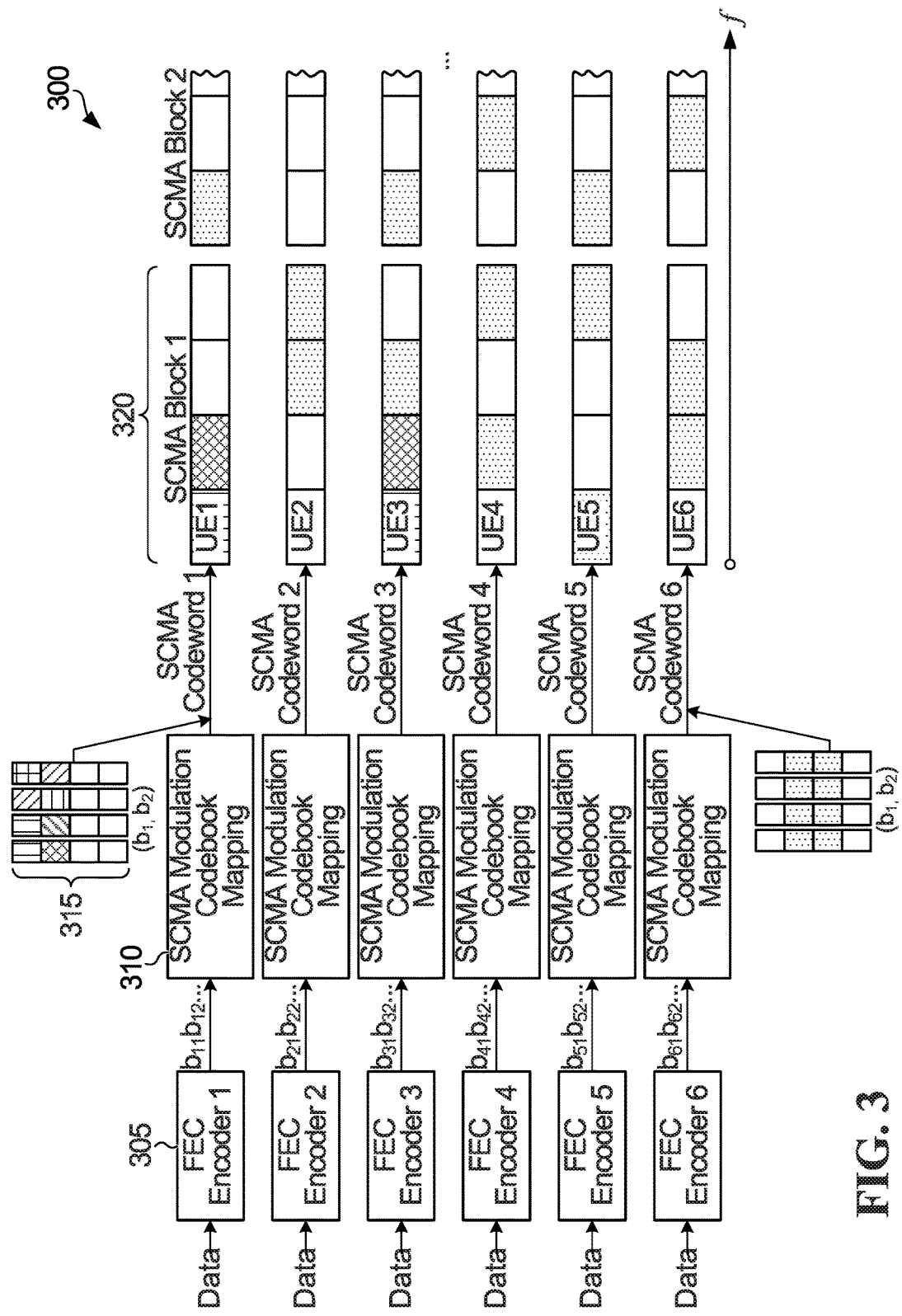
FIG. 3 illustrates an example SCMA multiplexing and an example process of data being modulated with example SCMA codebooks to fill SCMA blocks according to example embodiments described herein.

FIG. 3 illustrates a diagram 300 of SCMA multiplexing and data being modulated with example SCMA codebooks to fill SCMA blocks. Data is input to FEC encoders, such as FEC encoder 305, to produce encoded data to be transmitted to different UEs. The data for the different UEs is input to SCMA modulation codebook mapping units, such as SCMA modulation codebook mapping unit 310. The SCMA modulation codebook mapping units produce SCMA codewords, such as SCMA codewords 315. SCMA codewords are inserted into SCMA block 320. It is noted that as shown in FIG. 3, every layer has a FEC. In general, the number of FECs may be less than the number of layers. Therefore, in some embodiments, coded bits output from a FEC can be provided to more than one SCMA modulation codebook mapping unit. Furthermore, one or more layers may be assigned to a single UE.

As discussed previously, the decoding of SCMA codewords may be performed by a MPA. The decoding complexity is proportional to $m^D$ where m is the number of distinct projections of codebook points per non-zero complex dimension (or non-zero tone) and D is the number of overlapping layers per complex dimension.

In SCMA, different codebooks may be constructed by mapping a mother constellation to different subsets of complex dimensions. In some embodiments, minimizing the number of distinct projections of constellation points per complex dimension results in a reduction in the computational complexity of the MPA used in SCMA decoding. As an example, reducing the number of distinct projections per complex dimension to less than the number of distinct constellation points results in a reduction in the computational complexity required to decode the codewords. In some embodiments, having a consistent phase rotation, or maintaining alignment of the phase rotation, between the complex constellations that collectively make up an N-dimensional complex constellation ensures that real and imaginary components of the complex constellation can be detected independently. This may allow a pair of MPA decoders to be used at the receiver to detect the real and imaginary components independently, which can also reduce the complexity at the receiver. In some embodiments, log-likelihood ratios (LLRs) output from the pair of MPAs can be shuffled before a FEC decoder so decoding can be done jointly. In some embodiments, LLRs output from the pair of MPAs can be decoded independently.

Co-assigned U.S. patent application Ser. No. 13/730,355, entitled "Systems and Methods for Sparse Code Multiple Access," filed Dec. 28, 2012, which is hereby incorporated herein by reference, presents a detailed discussion of SCMA, SCMA decoding, generation of codebooks from mother constellations, and the like. Co-assigned U.S. patent application Ser. No. 13/919,918, entitled "System and Method for Designing and Using Multidimensional Constellations," filed Jun. 17, 2013, which is hereby incorporated herein by reference, presents techniques wherein a rotation, such as a unitary rotation, is applied to a SCMA constellation to reduce the number of projections per complex dimension. Co-assigned U.S. patent application Ser. No. 14/825,886, entitled "System and Method for Generating Codebooks with Small Projections per Complex Dimension and Utilization Thereof" filed Aug. 13, 2015, which is hereby incorporated herein by reference, presents techniques for generating codebooks with small projections per complex dimension and utilization thereof.

Figure 4A:
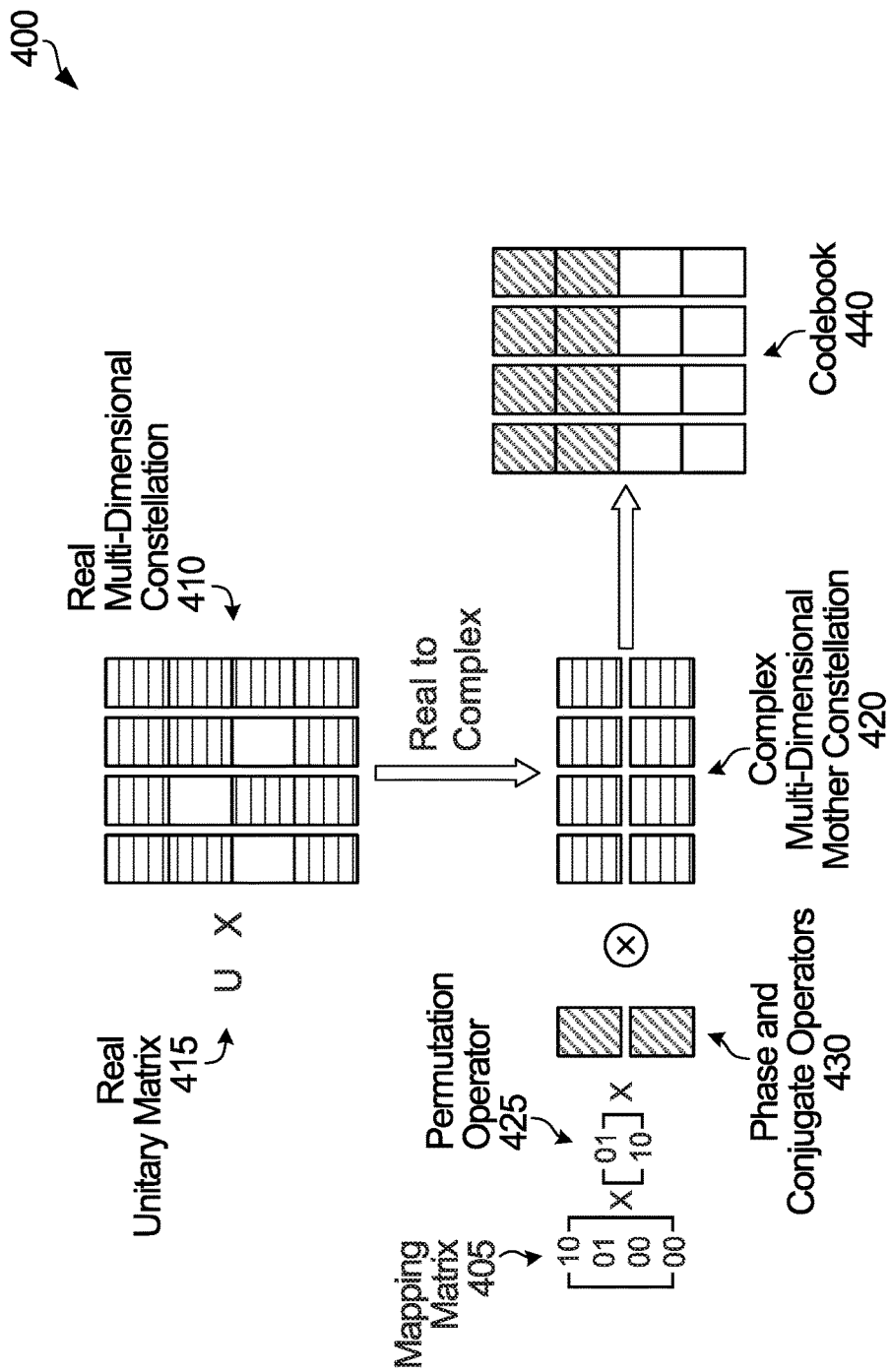
FIG. 4A illustrates an example technique for generating a codebook according to example embodiments described herein.

FIG. 4A illustrates a technique 400 for generating a codebook 440. Codebook 440 may be used in a communications system that uses SCMA. In general, codebook 440 may be derived from one or more multidimensional complex constellations. As shown in FIG. 4A, technique 400 includes selecting parameters which include a mapping matrix 405, a real multidimensional constellation 410, a real unitary matrix 415, a multidimensional complex mother constellation 420, a permutation operator 425, and phase and conjugate operators 430. Additionally, operator X represents a matrix multiply operation, and operator ⊕ represents a permutation operation. It is noted that in some embodiments, multiple multidimensional complex mother constellations are used to generate codebooks. Codebook 440 may be obtained by combining parameters 405, 410, 415, 420, 425 and 430 in the manner as shown in FIG. 4A. Multidimensional complex mother constellation 420 may be permuted by phase and conjugate operators 430 multiplied by mapping matrix 405. The multidimensional complex mother constellation 420 may be produced by multiplying real multidimensional constellation 410 with real unitary matrix 415, as well as a real to complex conversion. The mapping matrix 405 may be determined in accordance with a non-zero transmission resource assigned to a particular multiplexed layer or UE.

More generally, the codebooks for different SCMA layers are constructed based on the mother constellation and a layer specific operator for a given layer. The layer specific operator may be considered a layer specific signature. In uplink, as the layers pass through different channels, layer specific phase rotation loses its importance. However in the downlink for layers with a same channel experience, a destructive codeword collision can be avoided by careful selection of the phase rotations and power levels of different layers. Another feature of the layer specific signature may include an ability to vary the power offset on a layer by layer basis, if and where desirable.

In some embodiments mapping matrix 405, permutation operator 425 and phase and conjugate operators 430 collectively are considered operators that form the layer specific signature. In some embodiments, other operators than these three may be considered part of the layer specific signature. When multiplied by the complex mother constellation, the layer specific signature generates codewords for a layer specific codebook. Each codeword defines an arrangement of values on a plurality of transmission resources, or tones. A subset of the plurality of transmission resources, say N of the transmission resources where N≥2, are each encoded with a non-zero value and a remainder of the plurality of transmission resources are each assigned a zero value. Each codeword is a result of mapping an N-dimensional complex constellation on to the plurality of transmission resources by using the layer specific signature to map the N-dimensional complex constellation. This mapping may be conceptualized as mapping a point to a projection on each of N separate complex constellations, the N separate constellations collectively representing the N-dimensional complex constellation, on to each of one of the N transmission resources. In some embodiments of the disclosure, the layer specific signature used for mapping the projection of each of the N separate complex constellations onto each of the N non-zero transmission resources contains operators having a same phase for mapping the projections of each of the N separate complex constellations on to N non-zero transmission resources. When the layer specific signatures used for generating other codebooks being used by a same transmitting device have the same phase there is a benefit at the receiver that is described below.

When the operators of the layer specific signatures are selected to have a same phase, the real and imaginary components of projections mapped on the non-zero valued transmission resources will be independent of one another. A particular benefit of the real and imaginary components being independent of one another is that the components can be decoded independently of another, thereby reducing the complexity of the decoder. In some embodiment this may entail using two MPA type decoding algorithms in a receiver, one for decoding real components of the received signal and one for decoding imaginary components of the received signal.

In some embodiments, channel estimation is performed to estimate the channel conditions and the channel estimate may be used in order to compensate for the complex nature of the channel. If a receiver is receiving transmissions from multiple transmitters, the receiver may use the channel estimate to aid in detecting a signal from a first transmitter. As described above, the received signal for the first signal may be the sum of multiple SCMA codewords of different layers that have been multiplexed together. In some embodiments, the codewords are demultiplexed to separate out the respective codewords and then the real and imaginary components are decoded independently, for example with the two MPA type algorithms. Decoding the real and imaginary components of the complex constellations separately may reduce the complexity of MPA calculations by a factor of a square root of the complexity of MPA calculations. The receiver than can proceed to detect a signal from a second transmitter and decode the real and imaginary components of that signal, and so forth until the signals from each transmitter of the multiple transmitters are decoded.

Another manner of using the channel estimate may be to use the channel estimate at one or more transmitters to pre-compensate the transmitted signal so that the phase value of the received signals from all transmitters is the same, once again allowing the real and imaginary components to be decoded separately.

Figure 4B:
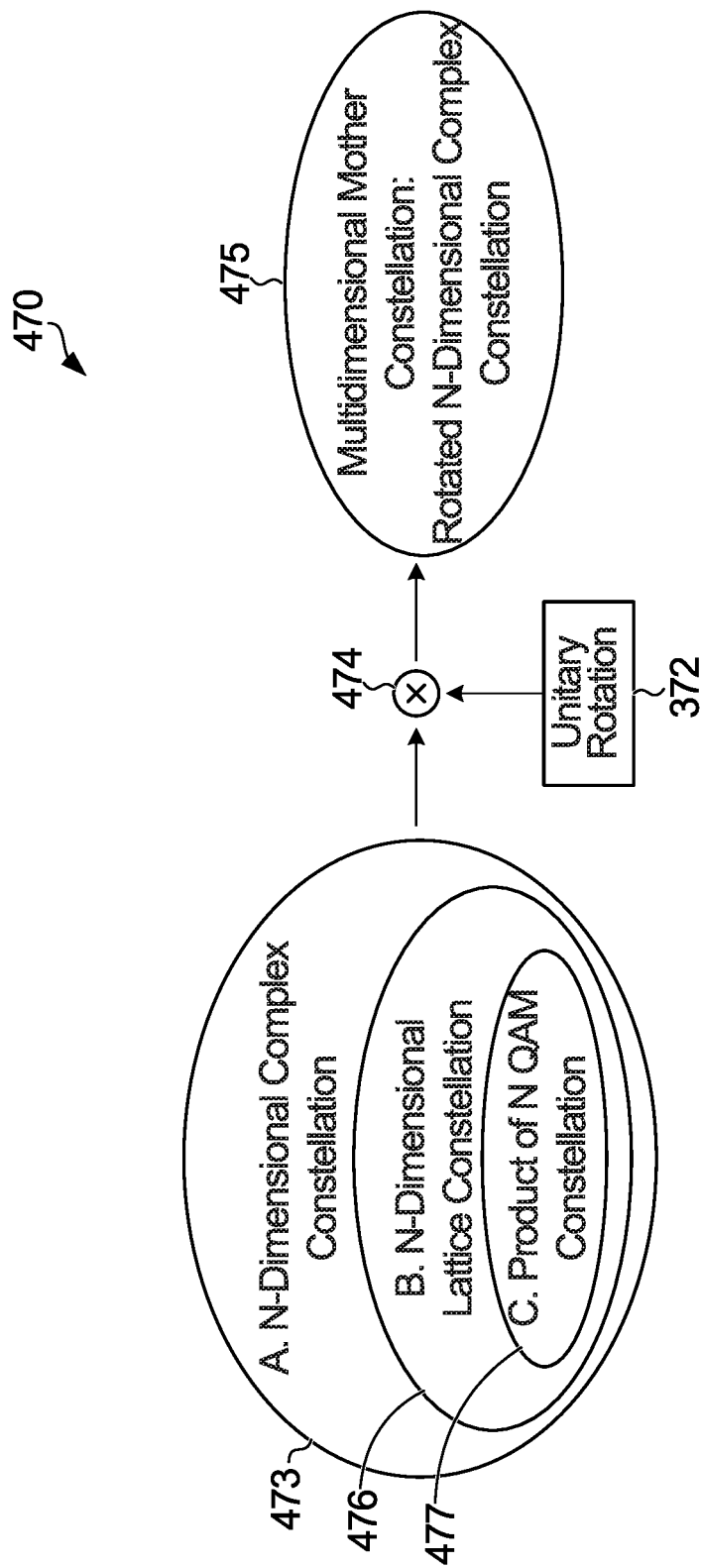
FIG. 4B illustrates an example technique for generating a multidimensional complex mother constellation according to example embodiments described herein.

FIG. 4B illustrates a schematic diagram of a technique 470 for generating a multidimensional complex mother constellation. As discussed above, a unitary rotation 472 may be applied to an N-dimensional complex constellation 473 using matrix multiplication operation 474 to produce a multidimensional mother constellation 475, which is a rotated N-dimensional complex constellation. However, to obtain good performance in communications systems, such as SCMA communications systems, a design criterion that may be used in selecting N-dimensional complex constellation 473 is to maximize the minimum Euclidean distance. Furthermore, an additional design criterion may be to reduce the number of neighboring points in each constellation. It is noted that unitary rotation 472 may be applied in real and/or imaginary domains.

Unitary rotation 472 may also be selected in accordance with a design criterion that specifies that unitary rotation 472 optimizes (e.g., maximize or minimize) a distance function of points in multidimensional mother constellation 475 while maintaining Euclidean distance of N-dimensional complex constellation 473. The distance function may be considered in general to be a function of the distances of the projections of the points in multidimensional mother constellation 475. As an example, the distance function may be the minimum product distance of the projections of points in multidimensional mother constellation 475. This may be described as the minimum of the product of distances of projections of each pair of points in multidimensional mother constellation 475. Another example of a distance function includes an average product distance of constellation points (as example of which is pair wise average) in multidimensional mother constellation 475. A further example includes a minimum of a generalized mean of distances of projections for pairs of constellation points of multidimensional mother constellation 475 with exponent p (where p ranges from [0, 1]). It is possible to use any specific function of the distance of the projections of the points in multidimensional mother constellation 475 as the distance function. A sub-optimal design criterion for unitary rotation 472 may be to increase the above design criterion i.e. maximizing the minimum product distance of the projections of points in multidimensional mother constellation 475 while maintaining Euclidean distance of N-dimensional complex constellation 473, while at the same time, reducing the number of projections per complex dimension. As an illustrative example, N-dimensional complex constellation 473 may contain 16 points but after application of unitary rotation 472, the projections of multidimensional mother constellation 475 may contain 9 points for lower detection complexity.

The use of N-dimensional complex constellation 473 may produce a most accurate mother constellation. However, the generation of a constellation that meets the corresponding design criterion can be difficult. It may be possible to use other constellations as a starting point for generating the mother constellations that are easier to generate and more suitable for labeling (especially for applying Gray labeling). However, this may reduce the performance of the SCMA codewords generated by the mother constellation. As an example, in place of N-dimensional complex constellation 473, an N-dimensional lattice constellation 476 or a product of N QAM constellations 477 may be used. Using the N-dimensional lattice constellation 476 instead of the N-dimensional complex constellation 473 may result in a mother constellation that is simpler to generate, but less optimal. Similarly, using the product of N QAM constellations 477 instead of the N-dimensional lattice constellation 476 may result in a constellation that is simpler to generate, but less optimal. If the product of N QAM constellations 477 is used in place of the N-dimensional complex constellation 473, the unitary rotation 472 may induce dependencies among dimensions of multidimensional mother constellation 475, which may be useful in recovery of data at the receiver as will be discussed below.

In general, to have good performance on a communications channel (especially on an uplink fading channel) dependency among the projections of the constellation points on different complex dimensions is desirable. However, the dependencies may also increase the number of projections per complex dimension. Hence, there may be a trade-off between complexity and performance. For constellations having a lower number of points, the selection of the constellations and labeling of constellation points may be performed by utilizing case-based optimization. For constellations having a larger number of points, generating a constellation may include the generation of desired projection points for each complex dimension using multi-dimensional constellations and labeling of the projection points. Detailed discussions of example embodiments of generating constellations are provided below.

As discussed previously, SCMA constellations that have small numbers of projections per complex dimension may have lower decoding complexity than SCMA constellations that have large numbers of projections per complex dimension. This may be especially true when a MPA receiver is used for decoding.

The constellation points may be labeled using labeling methods for lattice codes, such as those discussed in G. D. Forney, "Coset codes—part II: Binary lattices and related codes", IEEE Trans. Info. Theory, September 1988), which is incorporated herein by reference.

Figure 4C:
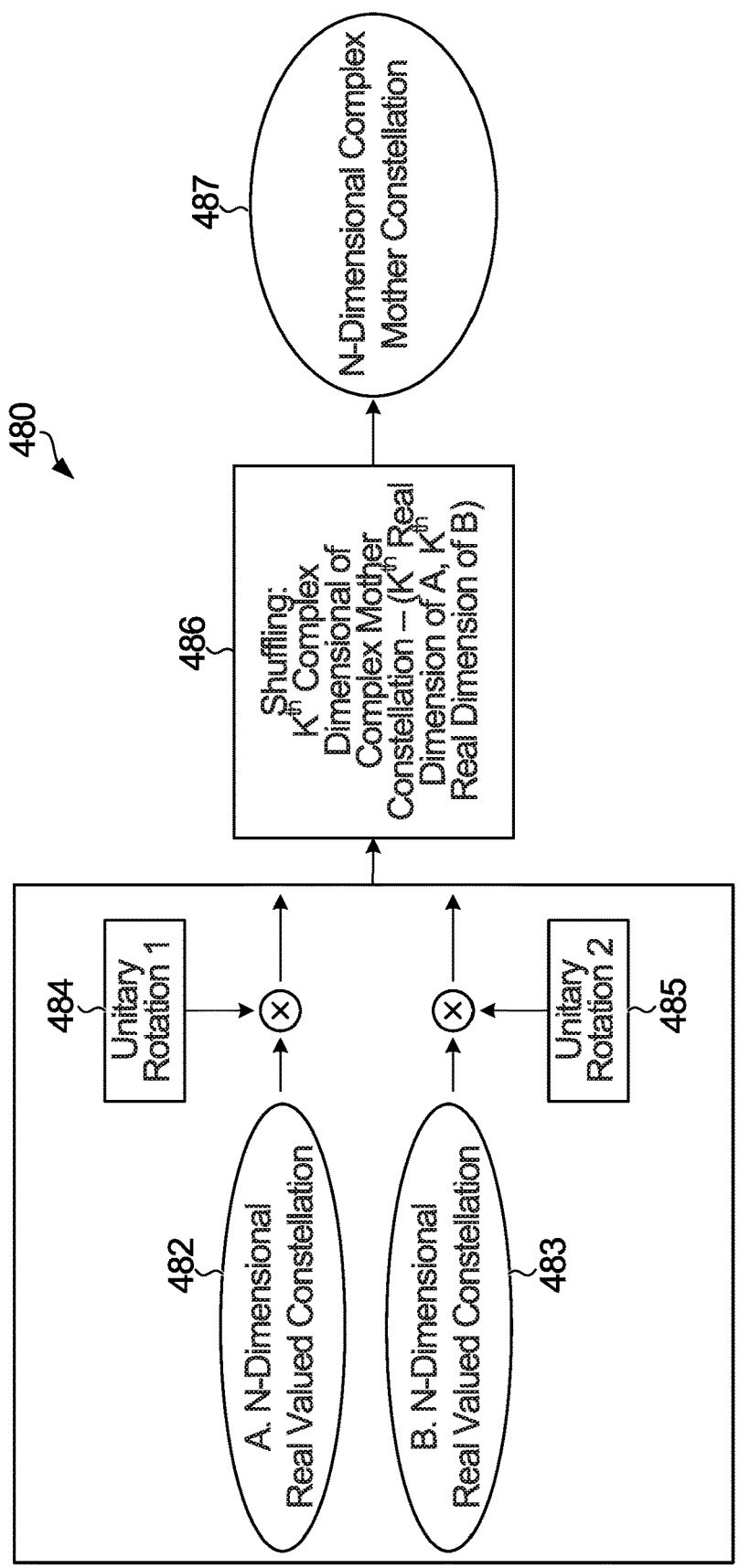
FIG. 4C illustrates an example technique for generating a multidimensional complex mother constellation using multiple real constellations according to example embodiments described herein.

FIG. 4C illustrates a schematic diagram of a technique 480 for generating a multidimensional complex mother constellation using multiple real valued constellations. Instead of using an N-dimensional complex constellation to generate a multidimensional mother constellation, two independent N-dimensional real valued constellations, a first N-dimensional real valued constellation 482 and a second N-dimensional real valued constellation 483, may be used. The two independent N-dimensional real valued constellations may be rotated by multiplying the constellations 482 and 483 with a first unitary rotation 484 and a second unitary rotation 485, respectively. The resulting two rotated N-dimensional real valued constellations may be considered parts of the multidimensional mother constellation. The two independent N-dimensional real constellations may be rotated independently of one another with different unitary rotations.

Figure 8A:
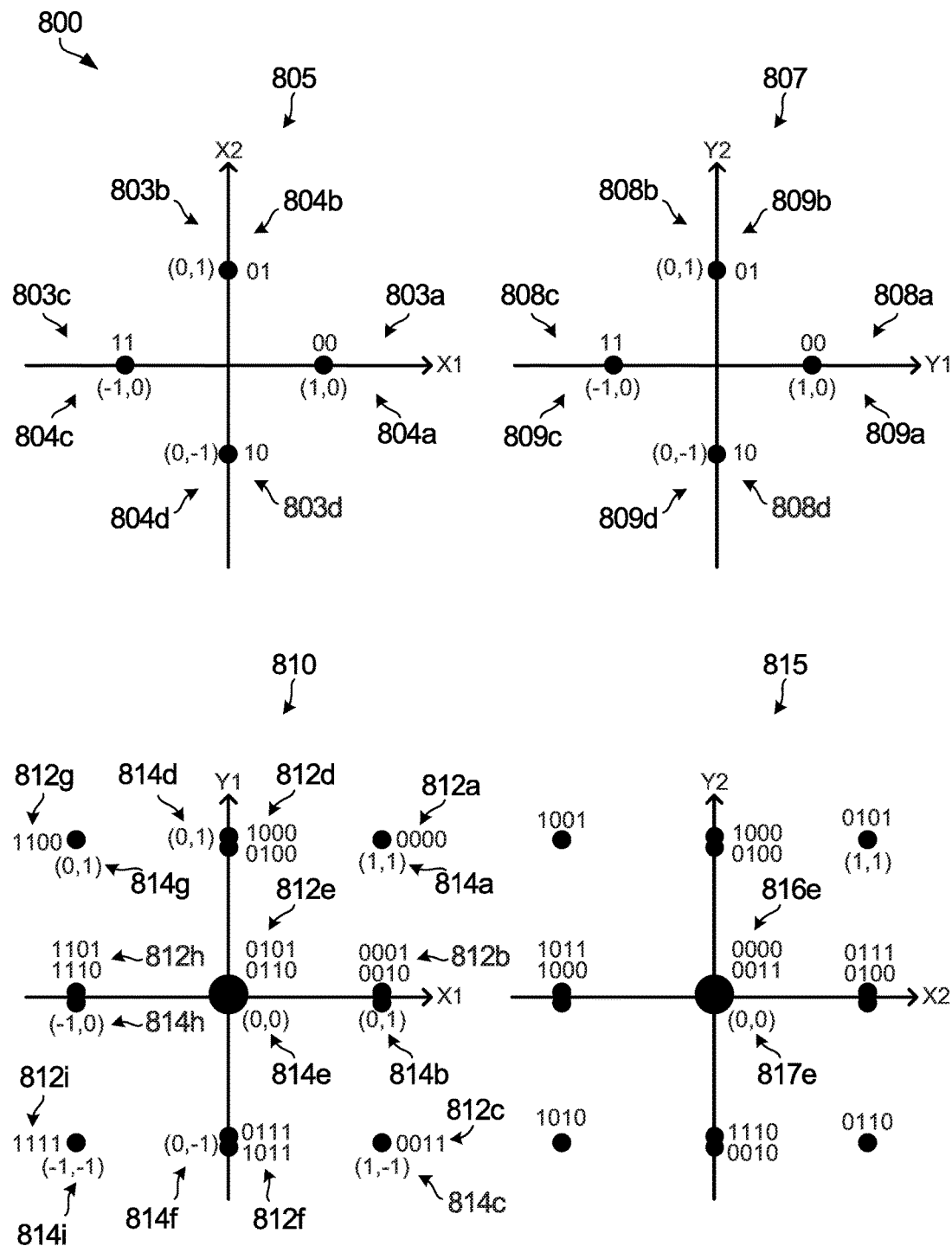
FIG. 8A illustrates a diagram of an example multidimensional complex constellation generated using two 4-point lattice constellations to generate a 16-point 2-dimensional complex constellation according to embodiments described herein.

Shuffling 486 may be applied to the resulting two rotated N-dimensional real constellations to produce N-dimensional complex mother constellation 487. Shuffling 486 may be expressed as the K-th complex dimension of the multidimensional mother constellation being equal to the K-th real dimension of the rotated version of first N-dimensional real valued constellation 482 as the real part and the K-th real dimension of the rotated version of second N-dimensional real valued constellation 483 as the imaginary part. In general, shuffling 486 induces dependency among dimensions of N-dimensional complex mother constellation 487. FIG. 8A described below will provide a particular example of shuffling.

Figure 4D:
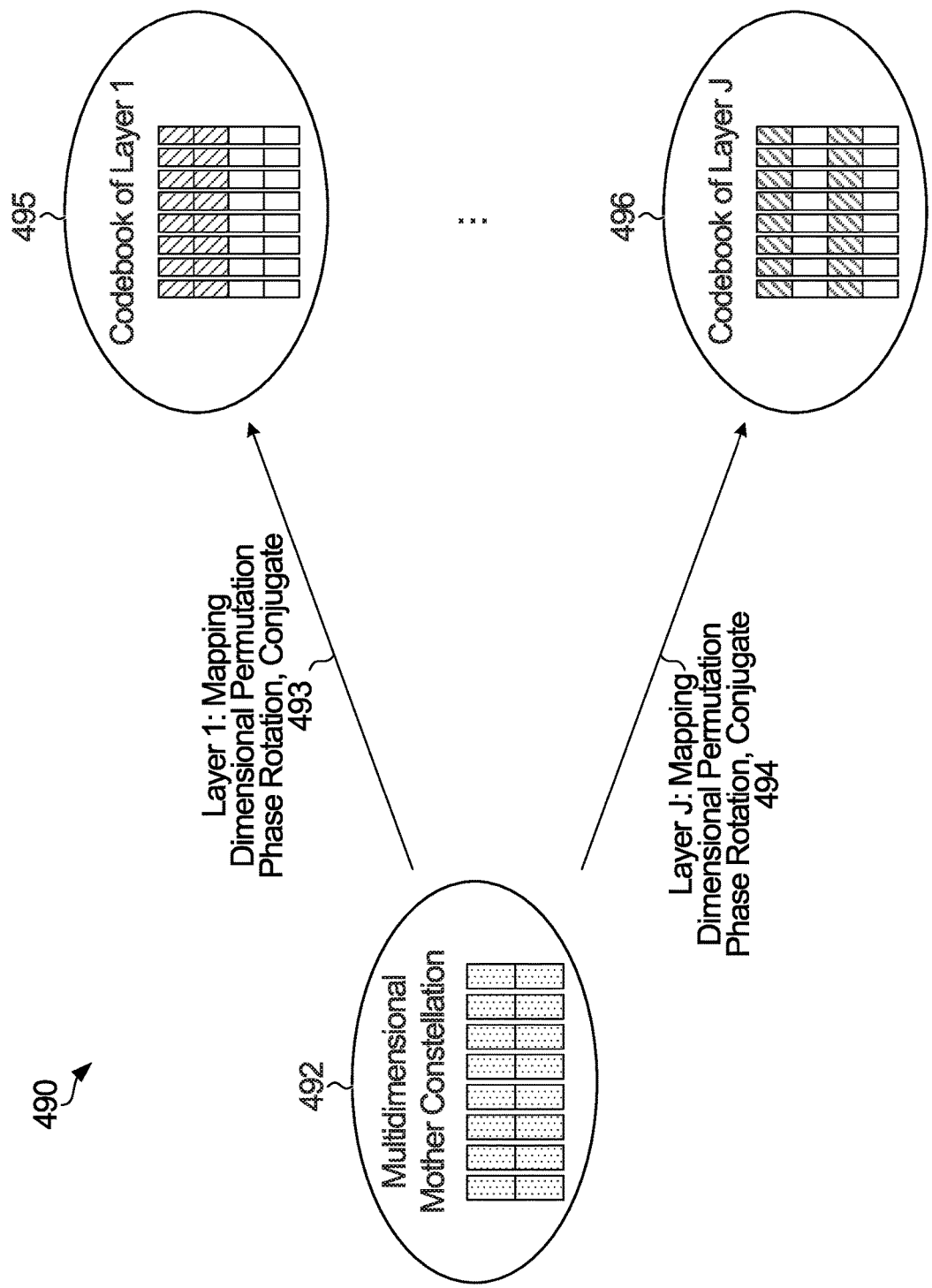
FIG. 4D illustrates an example technique for generating codebooks from a multidimensional complex mother constellation according to example embodiments described herein.

FIG. 4D illustrates a technique 490 for generating codebooks from a multidimensional complex mother constellation 492. In general, operations, such as mapping operations, dimensional permutation operations, phase rotation operations, conjugate operations, and combinations thereof, may be used to generate codebooks from multidimensional complex mother constellation 492. A first set of operations 493 may be applied to multidimensional complex mother constellation 492 to generate a first codebook 495, which may be assigned to a first layer. Similarly, a second set of operations 494 may be applied to multidimensional complex mother constellation 492 to generate a second codebook 496, which may be assigned to a second layer. Typically, a different set of operations may be used to generate a different codebook. It may be possible to use different multidimensional complex mother constellations in the generation of codebooks. As an illustrative example, two multidimensional complex mother constellations may be used in conjunction with three sets of operations to generate a total of 6 codebooks.

The technique of applying a unitary rotation to a multidimensional complex constellation may be used to generate a multidimensional complex mother constellation with maximized diversity gain and/or optimized distance function(s), such as maximized minimum product distance. The technique may include applying a unitary rotation that is specifically selected to maximize product distance to a multidimensional complex constellation with optimized minimum Euclidean distance. The unitary rotation may also maximize the diversity gain.

Figure 5:
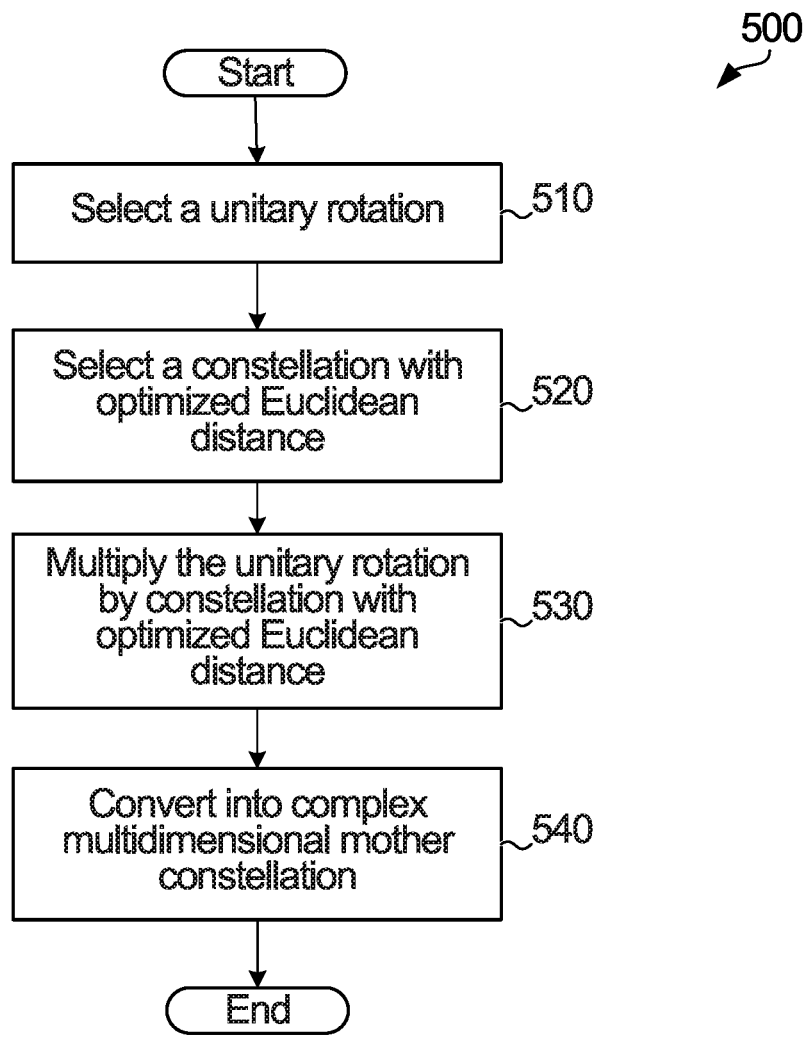
FIG. 5 illustrates an example flow diagram for generating a multidimensional complex constellation according to example embodiments described herein.

FIG. 5 illustrates a flow diagram 500 of operations in generating a multidimensional complex mother constellation. Operations 500 may be indicative of operations occurring in device, such as a transmitting device, e.g., an AP transmitting a downlink transmission to a UE or a UE transmitting an uplink transmission to an AP. The operations may also be implemented by a device that generates codebooks that are used by a transmitting device.

Operations may begin with the device selecting a unitary rotation that optimizes a distance function (block 510) for a constellation. The unitary rotation may optimize the distance function of projections of the points of a constellation, for example by maximizing the minimum product distance, while maintaining the Euclidean distance. The unitary rotation may also be selected to keep the real and imaginary components of the projections of generated mother constellations independent of one another. A set of unitary rotations to select from may be stored in a memory and retrieved by the device. Alternatively, multiple unitary rotations may be used to generate the multidimensional complex mother constellations, with specific unitary rotations being selected in accordance with a selection criterion. The selection criteria may include, but are not limited to, a multiplexed layer number, multiplexed layer identifier, UE identifier, and the like. The device may select a constellation with optimized Euclidean distance (block 520). A set of constellations to select from may be stored in a memory and retrieved by the device. The device may multiply the unitary rotation by the constellation, producing a multidimensional constellation (block 530). If the resulting constellation after multiplication of the unitary rotation is real-valued, a conversion, such as a real-to-complex operation, may be used to convert the real-valued multidimensional constellation to a multidimensional complex mother constellation (block 540).

Steps 510, 520, 530 and 540 may be performed for the generation of multiple constellations. Each constellation generated may be a component of the multidimensional complex mother constellation. As will be described below in further detail, additional operations may be performed, e.g., shuffling, to obtain multidimensional complex mother constellations from initially selected constellations.

As discussed above, it may be possible to utilize a sub-optimal constellation generated by multiplying constellations with a smaller number of points. In general, the sub-optimal constellation may be generated using independent constellations with a smaller number of points per dimension of the sub-optimal constellation. The use of the constellations the smaller number of points may reduce computational requirements when compared to a fully dimensioned constellation. Typically, the sub-optimal constellation may not have optimized Euclidean distance. As an illustrative example, two 4-point constellations, each in 2 real dimensions, may be multiplied together to produce a 16-point constellation in 4 real dimensions. The two 4-point constellations may have independent quadrature amplitude modulation (QAM) per dimension. It is noted that rotation of orthogonal constellations (i.e., independent QAM points on non-zero tones) may be used to induce dependency among non-zero tones and to mitigate the impact of collisions at a receiver. Furthermore, diversity (or equivalently, collision avoidance), which may be quantified by minimum product distance, may be achieved without sacrificing minimum Euclidean distance. A technique such as Gray labeling may be used for the QAMs. A unitary rotation may be applied to the sub-optimal constellation as described above to optimize a distance function of the sub-optimal constellation. An example of the distance function may be the minimum product distance.

In some embodiments no unitary rotation is utilized and independent QAM symbols are sent over active transmission resources.

Figure 6:
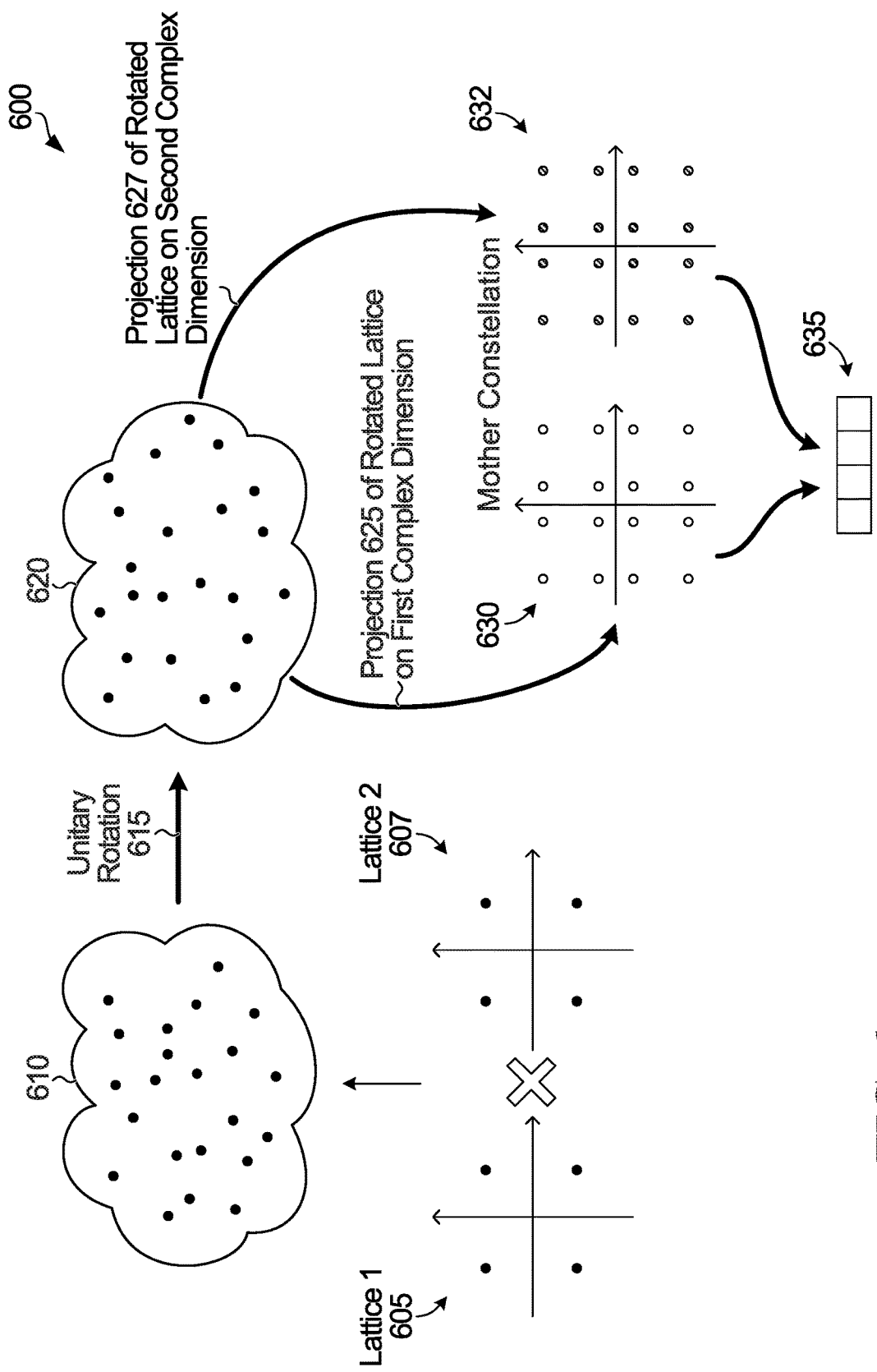
FIG. 6 illustrates an example technique in generating a multidimensional complex constellation according to example embodiments described herein.

FIG. 6 illustrates an example technique 600 for generating a multidimensional complex mother constellation. Technique 600 generates a multidimensional complex mother constellation from a starting point of using two 2-dimensional lattice constellations.

As shown in FIG. 6, two 2 dimensional lattice constellations (labeled "Lattice 1" 605 and "Lattice 2" 607), each with four points are multiplied together to produce a 16-point multidimensional constellation in 4 real dimensions (constellation 610). A unitary rotation 615 may be applied to constellation 610 to produce a 16-point multidimensional constellation in 4 real dimensions with an optimized product distance (constellation 620). Constellation 620 may be referred to as multidimensional mother constellation.

Projections of constellation 620, which may be a function of unitary rotation 615, are used to generate codebooks. The number of projections may be dependent on a number of non-zero tones present in a SCMA transmission. As an example, if a SCMA transmission comprises four tones with two of the four tones being non-zero, there will be two projections with that are dependent on the unitary rotation.

Codewords of codebooks are generated from the multidimensional mother constellation (constellation 620) based on applying a layer specific signature that includes a permutation operation to map the multidimensional mother constellation to the non-zero tones of a SCMA transmission 635. Linear operations or non-linear operations, or combinations of both, may be applied to the multidimensional mother constellation(s) to produce additional SCMA codebooks for different layers or different UEs, or both. Points in the two 2-dimensional lattice constellations (constellation 605 and constellation 607) may be represented by 2 bits each. Therefore, in the resulting 16-point multidimensional mother constellation, SCMA blocks may convey 4 bits of information.

Shuffling of multidimensional constellations may be performed. As with the sub-optimal constellation approach of utilizing the multiplication of smaller constellations, computational resources may be saved by rotating orthogonal constellations separately and independently for different axes, such as real and imaginary axes.

Figure 7:
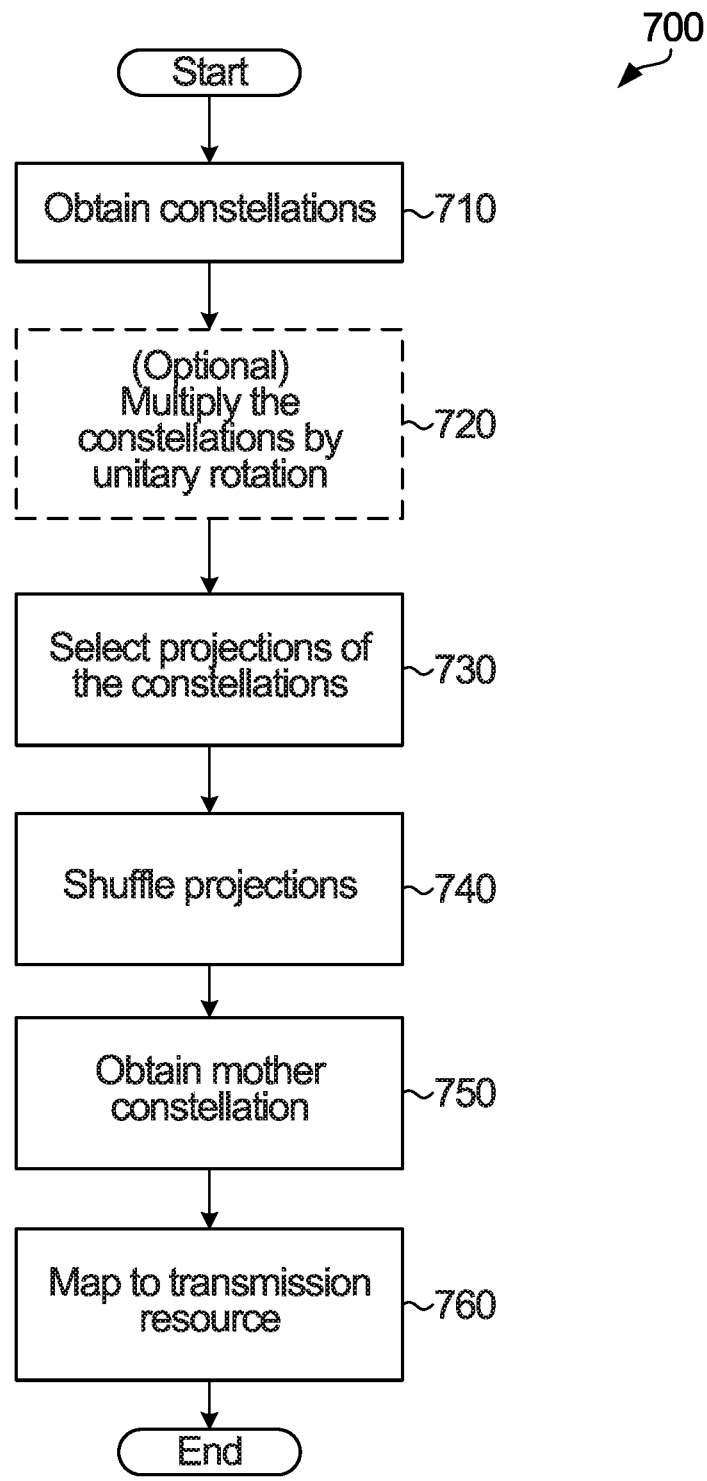
FIG. 7 illustrates an example flow diagram for generating a multidimensional complex constellation according to example embodiments described herein.

FIG. 7 illustrates a flow diagram 700 of operations occurring in a device as the device generates a multidimensional complex constellation utilizing shuffling. Operations 700 may be indicative of operations occurring in a device, such as a transmitting device, e.g., an AP transmitting a downlink transmission to a UE or a UE transmitting an uplink transmission to an eNB. The operations may also be implemented by a device that generates codebooks that are used by a transmitting device, as such a device generates a multidimensional complex constellation.

Operations begin with the device obtaining constellations (block 710). As an example, the device may obtain two independent N-dimensional constellations, where N is an integer value greater than or equal to 2. The N-dimensional constellations may be N-dimensional QAM constellations or N-dimensional lattice constellations. The device may optionally multiply the constellations by a unitary rotation (block 720). Rotation is optionally not used in some embodiments, so that there is no inter-dependence upon the real and imaginary components of the constellations. In such an implementation separate QAM symbols are sent over active transmission resources. The unitary rotation may be selected to keep the real and imaginary components of the projections of generated mother constellations independent of one another. The device selects a particular projection of the constellations (block 730), the rotated constellations if a unitary rotation is multiplied by the selected constellations, which will correspond to an eventual codeword of a given codebook. The device shuffles the projections (block 740). Shuffling may comprise a reorganization, regrouping, or reordering of the points in the projections of the rotated constellations. The result of shuffling the projections is a multidimensional mother constellation (block 750). A further operation includes mapping 760 the projections of the two rotated N-dimensional constellations to a representative transmission resource, such that when the codeword is selected, the projections map to the actual transmission resource allocated for transmission.

The separation of real and imaginary parts of a multidimensional constellation may help to reduce decoding complexity at a receiving device while maintaining dependency among the complex dimensions of the multidimensional mother constellation. As an illustrative example, in a MPA, if k signatures share the same non-zero tone, and if the number of projections of each constellation per real dimension is expressible as m (or $m^2$ per tone or per complex dimension), the complexity of decoding is proportional to $m^{2k}$ without real and imaginary part separation. However, if there is real and imaginary part separation, the complexity of decoding is proportional to $m^k$.

According to an example embodiment, a multidimensional constellation with a smaller number of projections per tone may help reduce computational requirements at a receiving device. When MPA is utilized to decode multiplexed codeword(s) at a receiving device, the decoding complexity increases with a larger number of non-zero projections associated with each tone. It may be possible to select a unitary rotation that minimizes the number of non-zero projections associated with each tone, thereby helping to reduce decoding complexity. However, minimum product distance may be sacrificed and performance may be impacted.

FIG. 8A is a diagram 800 showing how two eight-point constellations can be shuffled to generate two multidimensional complex constellations. A first 2-dimensional lattice constellation 805 represents a rotated first QAM to maximize product distance and a second 2-dimensional lattice constellation 807 represents a rotated second QAM to maximize product distance. The shuffling results in a 16-point constellation in 4 dimensions. The 4 dimensions may be represented collectively as two complex (i.e. 2-dimensional) mother constellations 810, 815. Each point 814a-814i of the complex constellation 810 can be considered a coordinate pair and each point has an associated label 812a-812i. The coordinate pair includes a real component and an imaginary component. Complex mother constellation 810 is representative of all the points created by the Cartesian product of 2-dimensional lattice 805 and 2-dimensional lattice 807. Multiplying the complex mother constellations by a layer specific signature will generate the codewords. A single codeword is a representative value for a single point in each of the two complex mother constellations 810 and 815. The collection of codewords, one for each respective point of the complex mother constellations, is the codebook.

The two complex mother constellations 810 and 815 of FIG. 8A collectively represent the 2-dimensional complex constellation that is encoded on 2 non-zero tones, one complex mother constellation per tone, in an SCMA codeword. In the example of FIG. 8A, the 2 non-zero tones are arranged amongst a total of 4 tones. The arrangement of non-zero valued tones and zero valued tones is determined by the layer specific signature.

The following describes an example of how a point in each of the two lattice constellations 805 and 807 is mapped to the 2 complex mother constellations 810 and 815 to create a codeword. An x axis component of a point on the 2-dimensional lattice constellation 805 is mapped to a real component of a point on the complex mother constellation 810. An x-axis component of a point on the second 2-dimensional lattice constellation 807 is mapped to the imaginary component of the point on the complex mother constellation 810. The x-axis value is a first value of a constellation point coordinate pair (x,y) and the y-axis value is the second value. Referring to FIG. 8A, the x-axis component of the coordinate pair (1,0) 804*a* from lattice constellation 805, which has a label of "00" 803*a*, is mapped to the real axis of the first complex constellation 810; and the x-axis component of the coordinate pair (1,0) 809*a* on lattice constellation 807, which has a label of "00" 808*a*, is mapped to the imaginary axis of the first complex constellation 810. The label of the point on the first complex mother constellation 810 derived using this shuffling technique combines the labels of the respective points on the first and second 2-dimensional lattice constellations 805, 807, to arrive at the label "0000". A point on the second complex mother constellation 812 derived from using the same two respective points on the first and second 2-dimensional lattice constellations 805, 807 results in the point defined with the label "0000" at location (0,0) 817*e* on the second complex mother constellation 815. The y-axis component of the coordinate pair (1,0) 804*a* on lattice constellation 805 is mapped on the real axis of the second complex mother constellation 815; and the y-axis component of the coordinate pair (1,0) 809*a* on lattice constellation 807, which has a label of "00" 808*a*, is mapped on the imaginary axis of the second complex mother constellation 815.

It can be seen that multiple points overlap on the same projection for some of the projections on complex mother constellations 810,812 because there are 16 points spread over only 9 projections. As indicated above, having fewer projections aids in reducing the complexity of the decoding process at the receiver. In addition, because the complex constellations have an inherent interdependence of the two originating lattice constellations due to the shuffling operation, this interdependence aids in recovery of the codewords even though particular tones on which codewords are mapped may overlap.

Aspects of the invention may more generally describe the use of modulating, by the device, a first data stream using a codebook to produce a second data stream. The codebook is layer specific and comprises a plurality of codewords. Each codeword of the codebook defines an arrangement of values on a plurality of transmission resources in which N of the transmission resources, N≥2, are each encoded with a non-zero value and a remainder of the plurality of transmission resources is each assigned a zero value. Each codeword is a result of mapping an N-dimensional complex constellation on to the plurality of transmission resources by using a layer specific signature. The layer specific signature is used to map the N-dimensional complex constellation in the form of mapping a point of each of N separate complex constellations on to each of one of the N non-zero transmission resources. The layer specific signature used for mapping the point of each of the N separate complex constellations on to each of the N non-zero transmission resources contains operators having a same phase for mapping the projections of each of the N separate complex constellations on to N non-zero transmission resources.

Figure 8B:
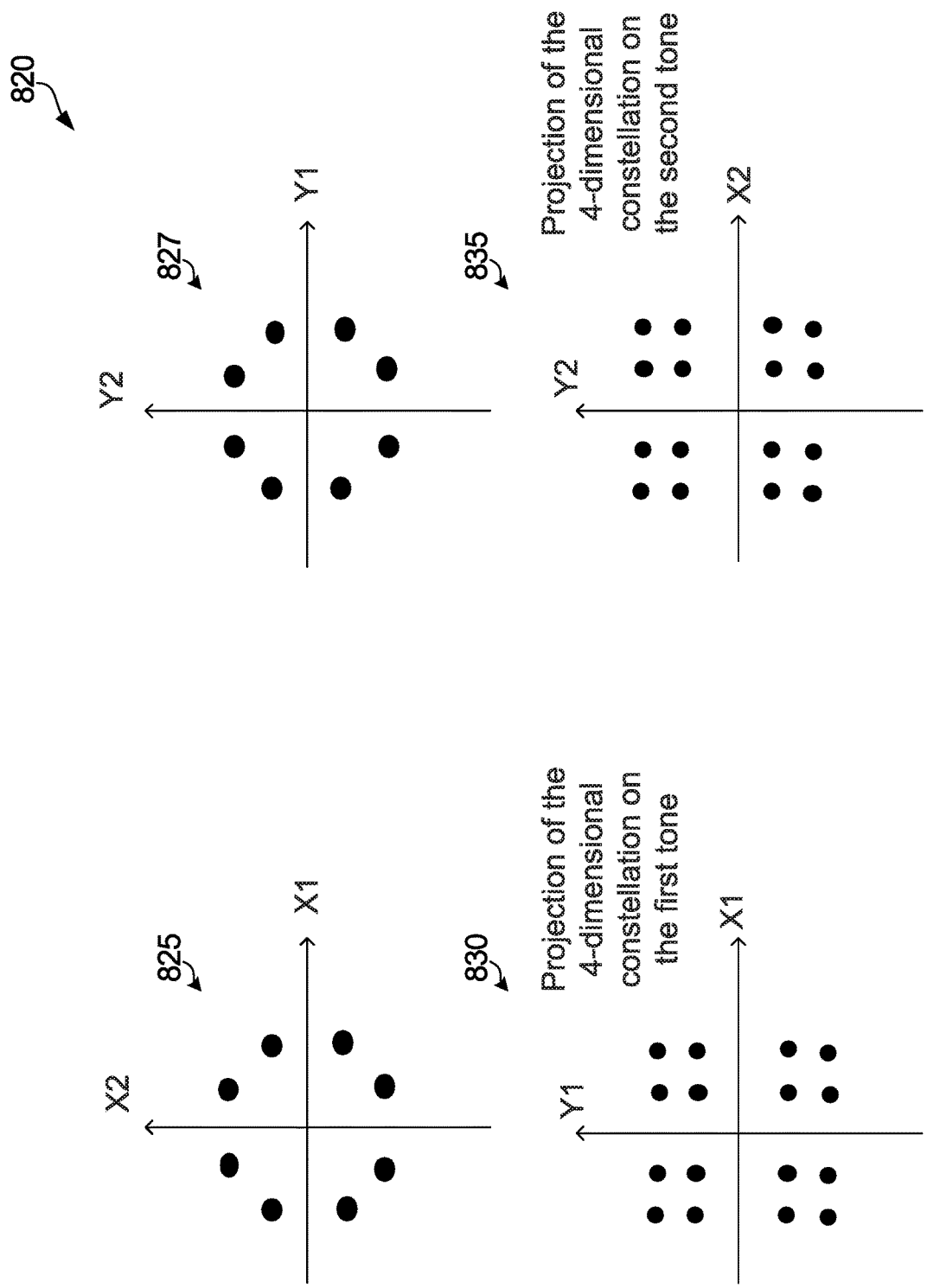
FIG. 8B illustrates a diagram of an example multidimensional complex constellation generated using two 8-point lattice constellations to map 64 points onto 16 projections of two complex mother constellations according to embodiments described herein.

FIG. 8B is a diagram 820 showing how two eight-point constellations can be shuffled to generate two multidimensional complex constellations having 64 points with a reduced number of 16 projections. The two complex mother constellations 825 and 827 of FIG. 8B collectively represent the 2-dimensional complex constellation that is encoded on 2 non-zero transmission resources, one complex mother constellation per transmission resource, in an SCMA codeword. A first 2-dimensional lattice constellation 825 includes eight points, each having a respective label (labels not shown), and a second 2-dimensional lattice constellation 827 includes eight points, each having a respective label (labels not shown). A first complex mother constellation 830 represents mapped projections that have first axis components of first 2-dimensional lattice constellation 825 as a real part and first axis components of second 2-dimensional lattice constellation 827 as an imaginary part. A second complex mother constellation 835 represents mapped projections that have second axis components of the first 2-dimensional lattice constellation 825 as a real part and second axis components of the second 2-dimensional lattice constellation 827 as an imaginary part. First complex mother constellation 830 and second complex mother constellation 835 each have 16 projections. Because there are 64 points in the multidimensional constellations, some of the projections may have more than 1 labelled point sharing the same projection.

Figure 8C:
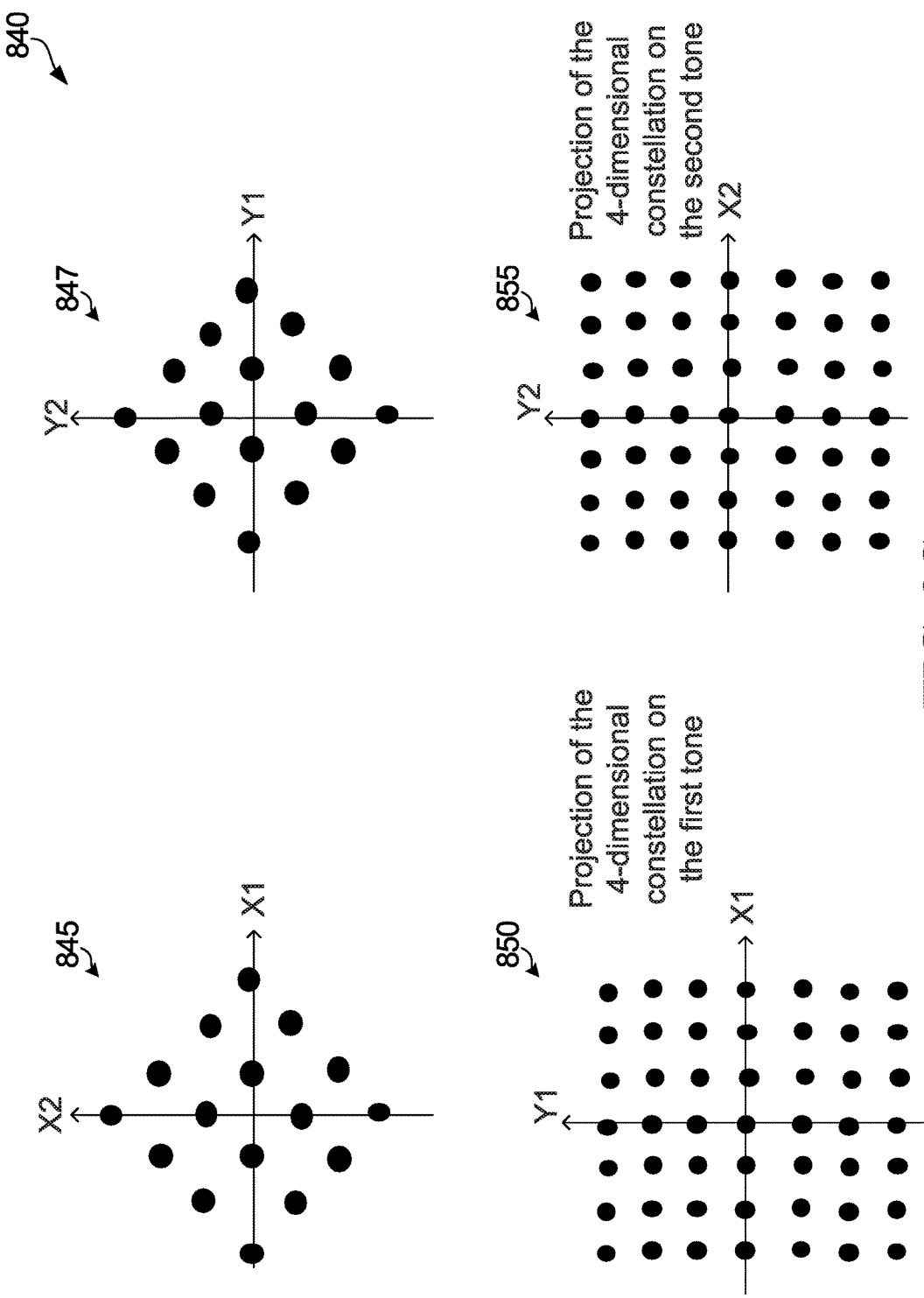
FIG. 8C illustrates a diagram of an example multidimensional complex constellation generated using two 16-point lattice constellations to map 256 points onto 49 projections of two complex mother constellations according to embodiments described herein.

FIG. 8C is a diagram 840 showing how two 16-point constellations can be shuffled to generate two multidimensional complex constellations having 256 points with a reduced number of 49 projections. The two complex mother constellations 845 and 847 of FIG. 8C collectively represent the 2-dimensional complex constellation that is encoded on 2 non-zero transmission resources, one complex mother constellation per transmission resource, in an SCMA codeword. A first 2-dimensional lattice constellation 845 includes 16 points, each having a respective label (labels not shown), and a second 2-dimensional lattice constellation 847 includes 16 points each having a respective label (labels not shown). A first complex mother constellation 850 represents mapped projections that have first axis components of first 2-dimensional lattice constellation 845 as a real part and first axis components of second 2-dimensional lattice constellation 847 as an imaginary part. A second complex mother constellation 855 represents mapped projections that have second axis components of the first 2-dimensional lattice constellation 845 as a real part and second axis components of the second 2-dimensional lattice constellation 847 as an imaginary part. First complex mother constellation 850 and second complex mother constellation 855 each have 49 projections, and as there are 256 points in the multidimensional constellations, some of the projections may have more than 1 labelled point sharing the same projection.

Figure 8D:
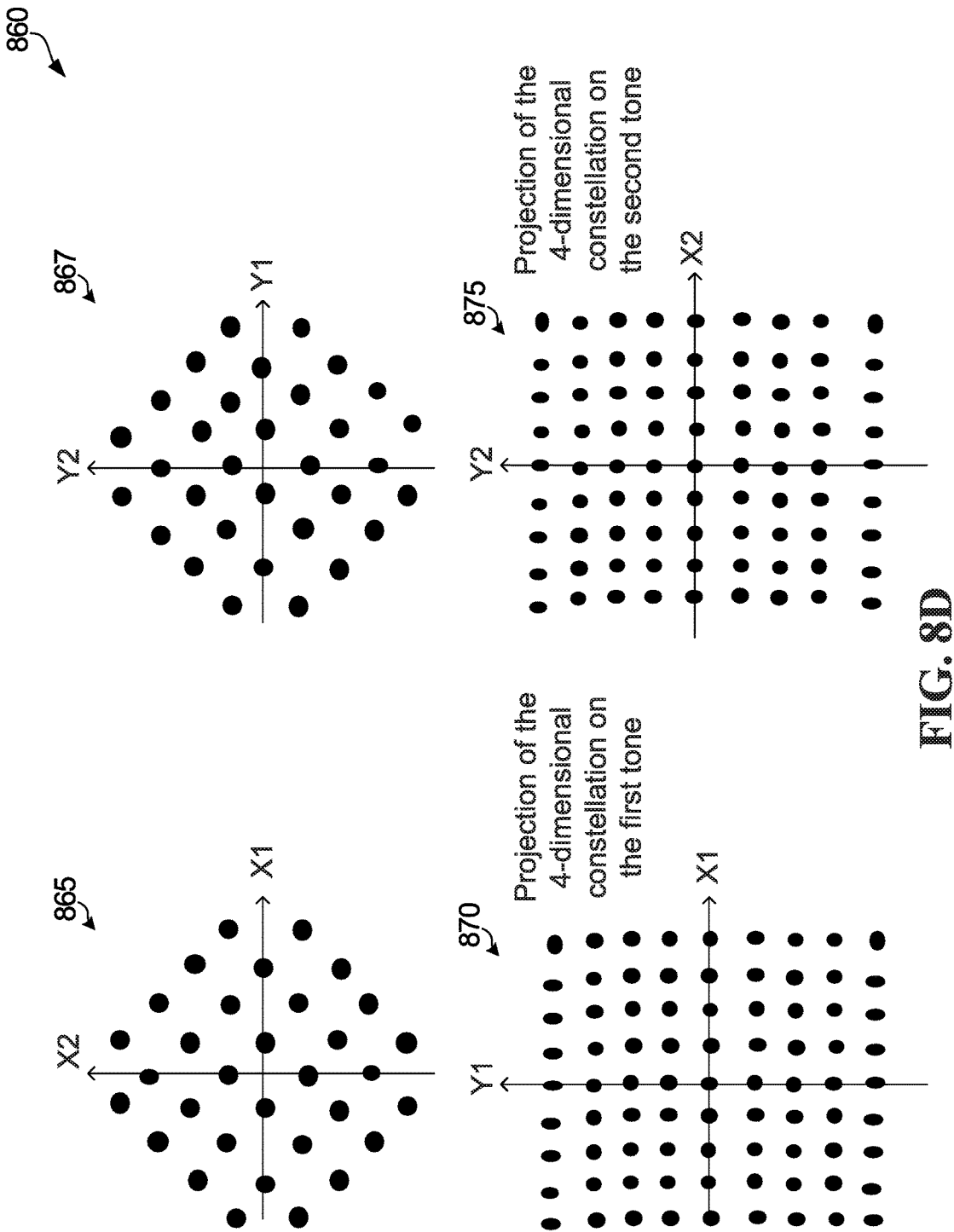
FIG. 8D illustrates a diagram of an example multidimensional complex constellation generated using two 32-point lattice constellations to map 1024 points onto 81 projections of two complex mother constellations according to embodiments described herein.

FIG. 8D is a diagram 860 showing how two 32-point constellations can be shuffled to generate two multidimensional complex constellations having 1024 points with a reduced number of 81 projections. The two complex mother constellations 865 and 867 of FIG. 8D collectively represent the 2-dimensional complex constellation that is encoded on 2 non-zero transmission resources, one complex mother constellation per transmission resource, in an SCMA codeword. A first 2-dimensional lattice constellation 865 includes 32 points each having a respective label (labels not shown) and a second 2-dimensional lattice constellation 867 includes 32 points each having a respective label (labels not shown). A first complex mother constellation 870 represents mapped projections that have first axis components of first 2-dimensional lattice constellation 865 as a real part and first axis components of second 2-dimensional lattice constellation 867 as an imaginary part. A second complex constellation 875 represents mapped projections that have second axis components of the first 2-dimensional lattice constellation 865 as a real part and second axis components of the second 2-dimensional lattice constellation 867 as an imaginary part. First complex mother constellation 870 and second complex mother constellation 875 each have 81 projections. Because there are 1024 points in the multidimensional constellation, some of the projections may have more than 1 labelled point sharing the same projection.

Figure 9:
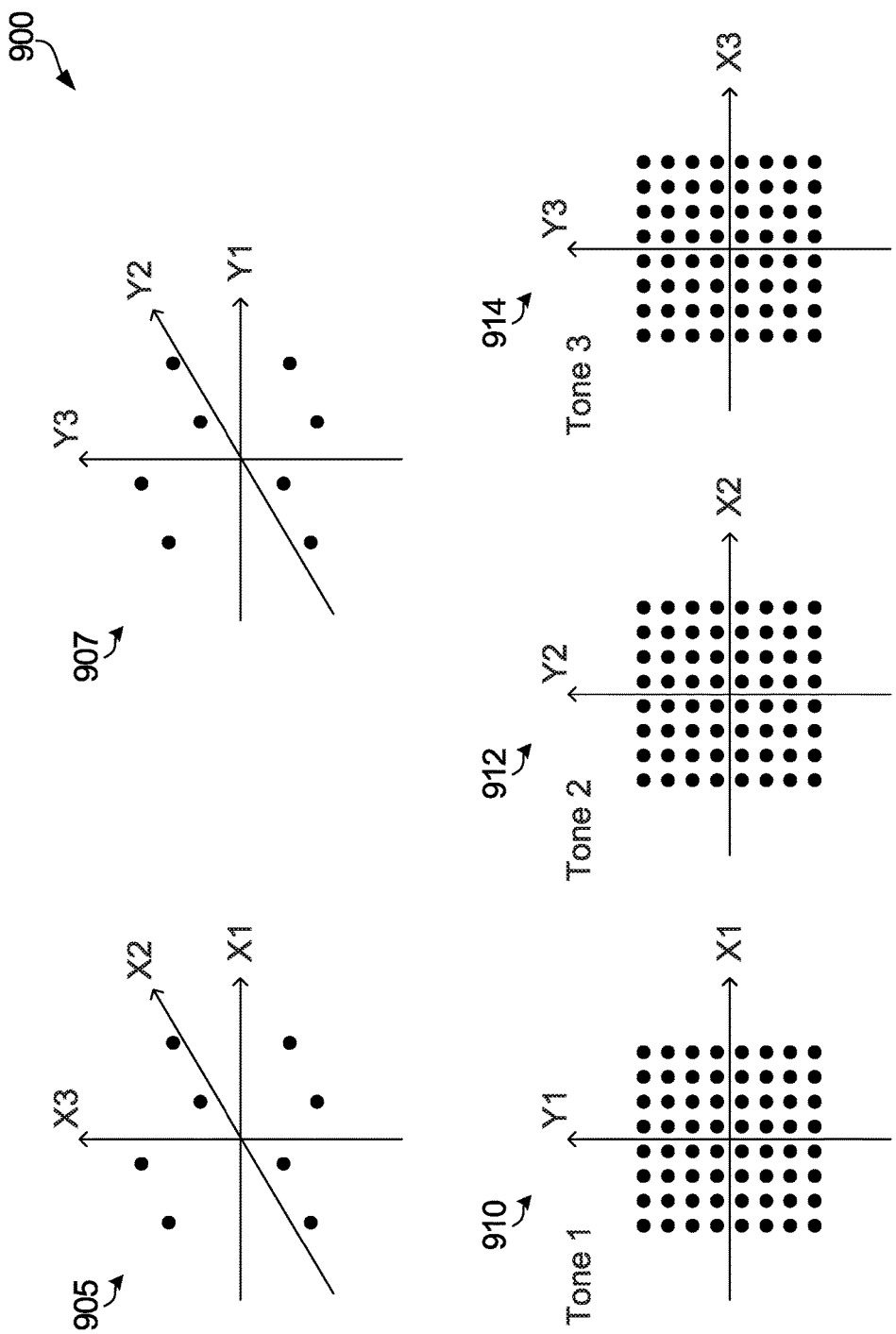
FIG. 9 illustrates a diagram of an example multidimensional complex constellation generated using shuffling for higher dimensions according to embodiments described herein.

FIG. 9 is a diagram 900 of an example multidimensional complex constellation generated using shuffling for higher dimensions. A first 3-dimensional lattice constellation 905 represents a rotated first 3-dimensional lattice to maximize product distance, and a second 3-dimensional lattice constellation 907 represents a rotated second 3-dimensional lattice to maximize product distance. A first 2-dimensional lattice 910 represents a first projection of a rotated lattice that has a first axis of 3-dimensional QAM constellation 905 as a real part and a first axis of 3-dimensional QAM constellation 907 as an imaginary part. A second 2-dimensional lattice 912 represents a second projection of a rotated lattice that has a second axis of the 3-dimensional QAM constellation 905 as a real part and second axis of the 3-dimensional QAM constellation 907 as an imaginary part. A third 2-dimensional lattice 914 represents a third projection of a rotated lattice that has a third axis of 3-dimensional QAM constellation 905 as a real part and a third axis of the second 3-dimensional QAM constellation 907 as an imaginary part.

Figure 10:
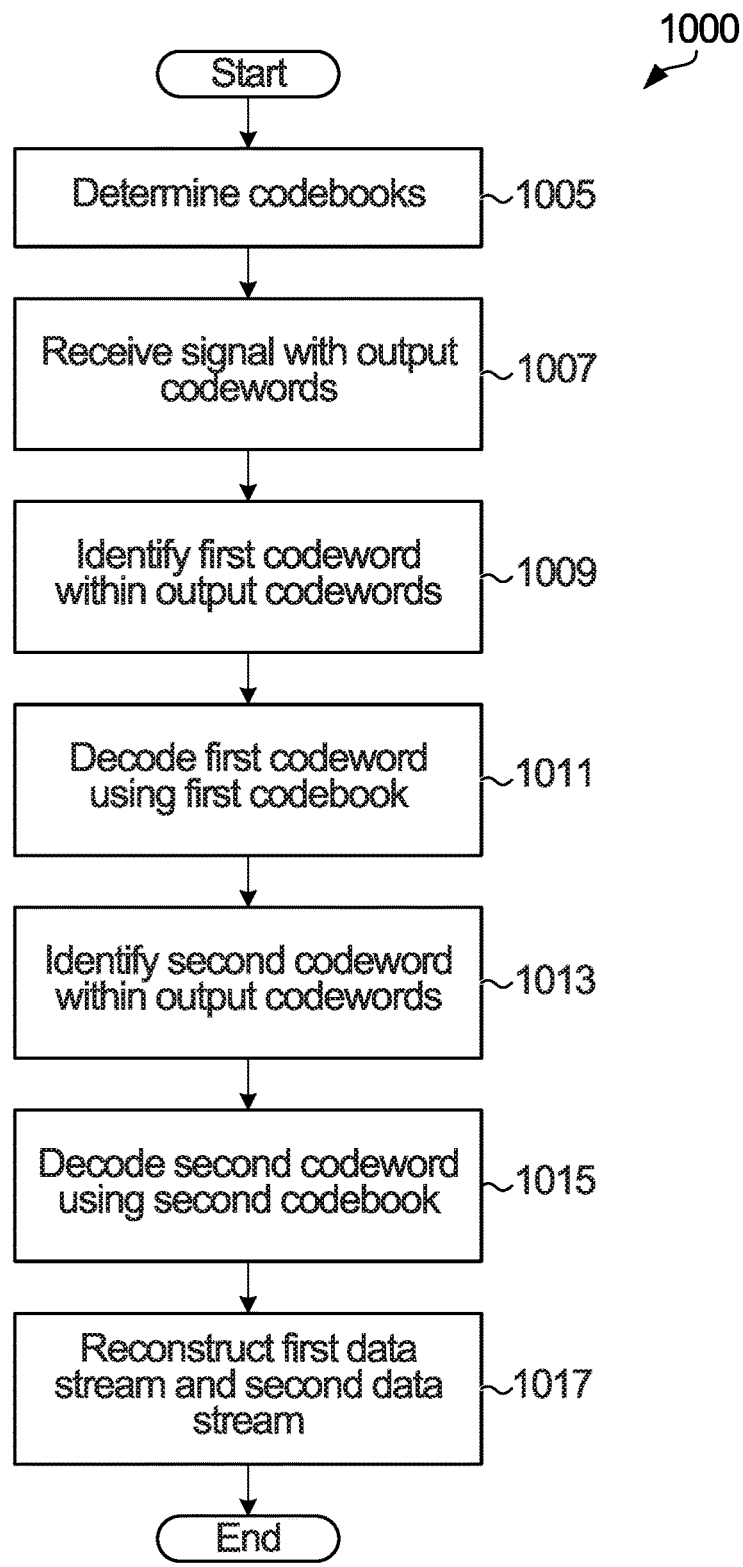
FIG. 10 illustrates a flow diagram for receiving and decoding an SCMA signal according to example embodiments described herein.

FIG. 10 illustrates a flow diagram of operations 1000 occurring in a device that receives information from a transmitting device. Operations 1000 may be indicative of operations occurring in a receiving device, such as an AP receiving an uplink transmission from a UE, or a UE receiving a downlink transmission from an AP, as the receiving device receives information from a transmitting device.

Operations 1000 may begin with the receiving device selecting a plurality of codebooks (block 1005). According to an example embodiment, the receiving device may retrieve the plurality of codebooks from a storage device, wherein the plurality of codebooks have been stored after generation. As an illustrative example, the receiving device may retrieve the plurality of codebooks during an initial power up sequence, during a reset sequence, or during an initiating sequence. The receiving device may be configured to retrieve the plurality of codebooks in a periodic manner, at specified times or upon receipt of an instruction. According to another example embodiment, the receiving device may generate the plurality of codebooks and store them in a local storage and/or memory for subsequent use.

The receiving device receives a signal containing multiple codewords that are multiplexed together (block 1007). The signal is received over shared resources of the communications system. The receiving device identifies a first codeword from the multiple codewords (block 1009). The first codeword is associated with a first codebook assigned to a first layer and may be soft-decoded by the receiver in accordance with a decoding algorithm, such as MPA. The receiver continues to soft-decode the multiple codewords in a similar fashion. The MPA produces likelihood probabilities, e.g., LLRs, and these likelihood probabilities can be provided to a FEC decoder to decode the information bits encoded in the codeword. In particular embodiments of the application, multiple decoding algorithms may be used, for example a first soft-decoding algorithm can be used for soft-decoding real components of the first codeword and a second soft-decoding algorithm can be used for soft-decoding imaginary components of the first codeword. Furthermore, the codewords may be soft-decoded jointly, and not necessarily in a sequential manner, as described below.

The receiving device decodes the first codeword as described above, at least in part using the first codebook, the soft-decoding algorithm and a FEC decoder to determine a first data (block 1011). The receiving device identifies a second codeword from the multiple codewords (block 1013). In this example the second codeword is associated with a second codebook assigned to a second layer and is soft-decoded in accordance with the soft-decoding algorithm. The receiving device decodes the second codeword at least in part using the second codebook, the soft-decoding algorithm and a FEC decoder to determine a second data (block 1015). Although the example focuses on the first layer and the second layer, there may be a greater number of layers. Embodiments presented herein are operable with any number of layers greater than two. The receiving device may reconstruct a first data stream from the first data and a second data stream for the second data, respectively (block 1017).

Figure 11A:
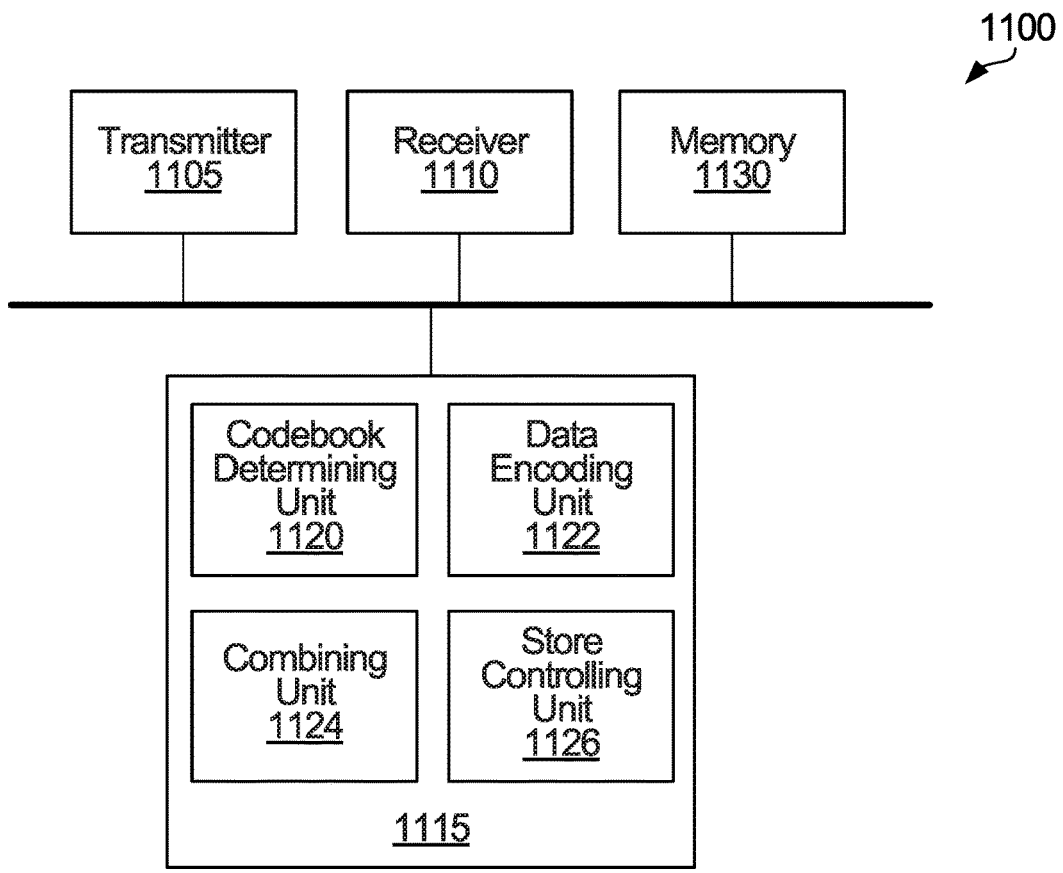
FIG. 11B illustrates a detailed view of a codebook determining unit according to example embodiments described herein.

FIG. 11A is a schematic diagram of a device 1100 for encoding and transmitting an SCMA signal. Device 110000 may be an implementation an access point. The device 1100 may be a UE, such as a mobile station. The device 1100 could also generate codebooks. Device 110000 may be used to implement various embodiments discussed herein. As shown in FIG. 11A, the device includes a transmitter 1105 and a receiver 1110.

In the implementation of FIG. 11A, a processor 1115 includes multiple modules, or units, for performing operations to encode data before transmission. A codebook determining unit 1120 is configured to generate a multidimensional mother constellation from a constellation. In some embodiments this may include applying a unitary rotation to the constellation. In some embodiments the codebook determining unit 1120 may use a previously generated multidimensional mother constellation. Codebook determining unit 1120 is configured to generate a codebook from the multidimensional mother constellation by applying a set of operations, such as mapping operations, dimensional permutation operations, phase rotation operations, conjugate operations, and combinations thereof. In some embodiments, the set of operations may be a layer specific signature, in which the phase of elements in the signature is the same. Codebook determining unit 1120 is configured to make projections of the rotated constellation, as well as shuffle axes. Codebook determining unit 1120 is configured to apply linear and/or non-linear operations to the constellations and/or projections. Codebook determining unit 1120 is configured to retrieve a codebook from a storage device. A data encoding unit 1122 is configured to encode data for a layer or UE utilizing a codebook assigned to the layer or UE. Data encoding unit 1122 is configured to select a codeword from the codebook in accordance with a value of the data. A combining unit 1124 is configured to combine codewords together to produce an output codeword. A store controlling unit 1126 is configured to control the storing and/or retrieving of information, such as codebooks, from a local storage, or a remote storage.

A memory 1130 is configured to store constellations, multidimensional mother constellations, unitary rotations, data, codebooks, codewords and output codewords.

The units 1120, 1122, 1124 and 1126 of device 1100 may be implemented as specific hardware logic blocks. In an alternative, the units 1120, 1122, 1124 and 1126 of device 1100 may be implemented as software executing in a processor, controller or application specific integrated circuit. In yet another alternative, the units of device 1100 may be implemented as a combination of software, hardware, or both.

In a particular implementation, receiver 1110 and transmitter 1105 may be implemented in the form of hardware blocks, and codebook determining unit 1120, data encoding unit 1122, multiplexing unit 1124, and store controlling unit 1126 may be software modules executing in a microprocessor (such as processor 1115) or a custom circuit or a custom compiled logic array of a field programmable logic array. Codebook determining unit 1120, data encoding unit 1122, multiplexing unit 1124, and store controlling unit 1126 may be modules stored in memory 1130.

Figure 11B:
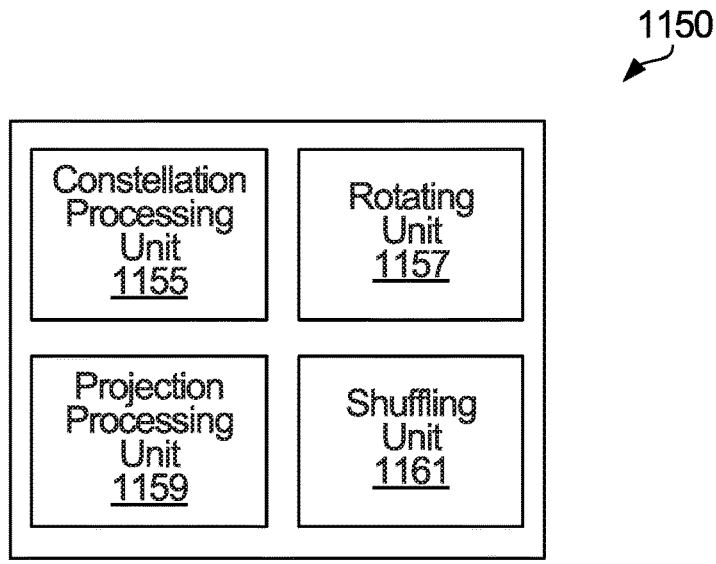

FIG. 11B is a schematic diagram of a codebook generating unit 1150 configured to generate codebooks. Codebook determining unit 1150 includes a constellation processing unit 1155, a rotating unit 1157, a projection processing unit 1159, and a shuffling unit 1161. Constellation processing unit 1155 is configured for processing constellations, including, but not limited to, multiplying constellations together and extracting parts, e.g., real and/or imaginary parts, of constellations. Rotating unit 1157 is configured to apply a unitary rotation to the constellation. The unitary rotation may optimize a distance function, such as maximize a minimum Euclidean distance. Projection processing unit 1159 is configured to make projection, e.g., along certain axes, of a constellation. Shuffling unit 1161 is configured to shuffle axes of a constellation.

The units 1155 1157, 1159 and 1161 of codebook determining unit 1150 may be implemented as specific hardware logic blocks. The units 1155 1157, 1159 and 1161 may be implemented as software executing in a processor, controller, or application specific integrated circuit. In yet another implementation, the units of codebook determining unit 1150 may be implemented as a combination of software, hardware, or both.

Figure 12:
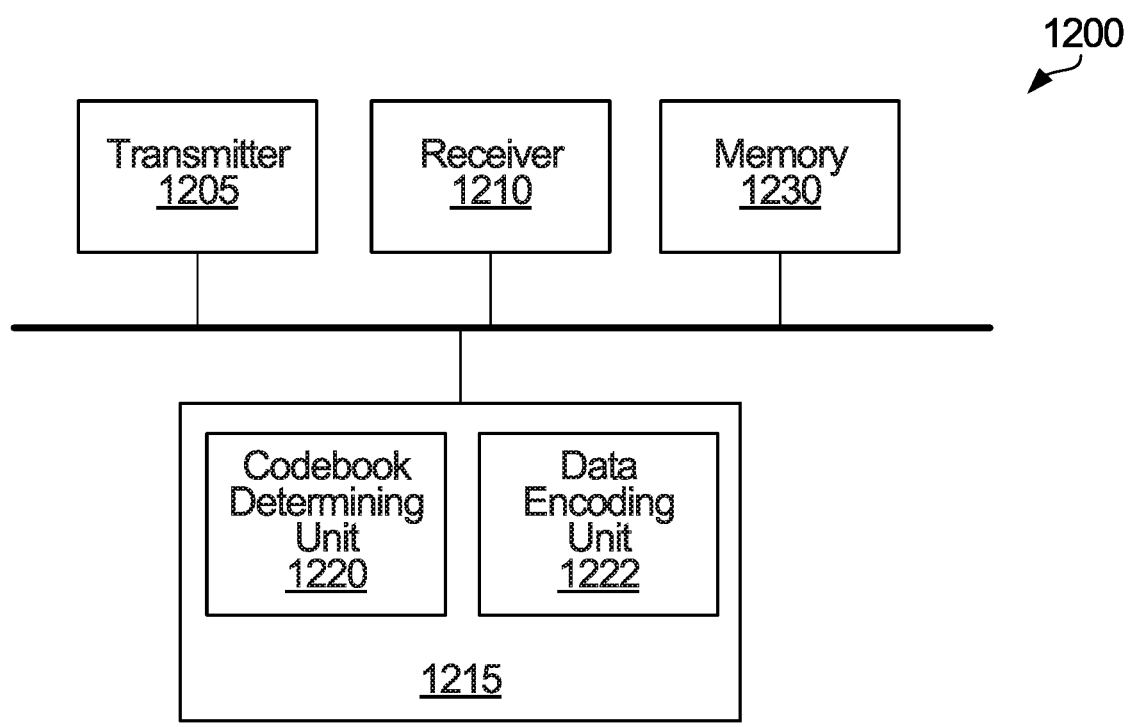
FIG. 12 illustrates a second device according to example embodiments described herein.

FIG. 12 is a schematic diagram of a device 1200 for receiving and decoding an SCMA signal. Device 1200 may be an access point. Device 1200 may be a UE, such as a mobile station. Device 1200 may be used to implement various embodiments discussed herein. The device 1200 is also shown to include a transmitter 1205 and a receiver 1210.

In the implementation of FIG. 12, a processor 1215 includes multiple modules, or units, for performing operations to decode data upon receipt. A codebook determining unit 1220 is configured to generate a multidimensional mother constellation from a constellation. In some embodiments this may include applying a unitary rotation to the constellation. In some embodiments the codebook determining unit 1220 may use a previously generated multidimensional mother constellation. Codebook determining unit 1220 is configured to generate a codebook from the multidimensional mother constellation by applying a set of operations, such as mapping operations, dimensional permutation operations, phase rotation operations, conjugate operations, and combinations thereof. In some embodiments, the set of operations may be a layer specific signature, in which the phase of elements in the signature is the same. Codebook determining unit 1220 is configured to make projections of the rotated constellation, as well as shuffle axes. Codebook determining unit 1220 is configured to apply linear and/or non-linear operations to the constellations and/or projections. Codebook determining unit 1220 is configured to retrieve a codebook from a storage device. In some embodiments a receiver may not generate codebooks, but may simply obtain existing codebooks from the network or be provided codebooks by the network, and store these codebooks on the device for later use. A data decoding unit 1222 is configured to decode received codewords utilizing a codebook associated with a respective layer or UE. Data decoding unit 1222 is configured to identify a codeword for a layer or UE from the received codewords using a decoding algorithm such as MPA. Data decoding unit 1222 may include two MPA decoding algorithms, one for real components and one for imaginary components, to aid in reducing the complexity of the receiver.

A memory 1230 is configured to store constellations, multidimensional mother constellations, unitary rotations, data, codebooks, codewords, and output codewords.

The units 1220 and 1222 of device 1200 may be implemented as specific hardware logic blocks. In an alternative, the elements of device 1200 may be implemented as software executing in a processor, controller or application specific integrated circuit. In yet another embodiment, the elements of device 1200 may be implemented as a combination of software, hardware, or both.

In a particular implementation, receiver 1210 and transmitter 1205 may be implemented as a specific hardware block, and codebook determining unit 1220, and data decoding unit 1222 may be software modules executing in a microprocessor (such as processor 1215) or a custom circuit or a custom compiled logic array of a field programmable logic array. Codebook determining unit 1220, and data decoding unit 1222 may be modules stored in memory 1230.

Figure 13:
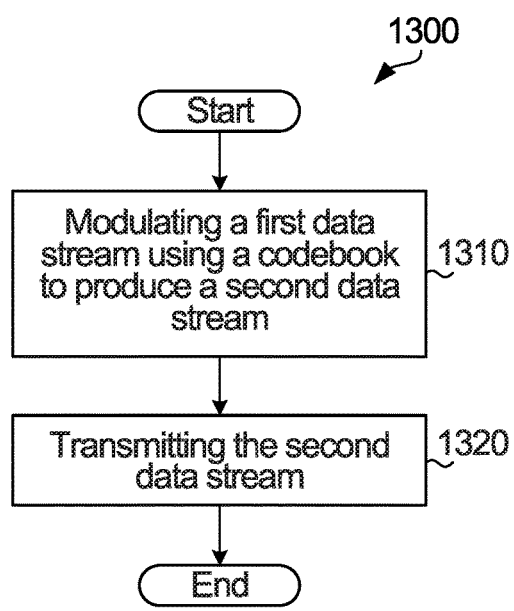
FIG. 13 illustrates a flow diagram for encoding and transmission of data according to example embodiments described herein.

FIG. 13 illustrates a flow diagram 1300 of a method occurring in the transmission of data using codebook(s) derived from N-dimensional lattice constellations that map to an N-dimensional complex constellation in the form of N complex mother constellations having independent real and imaginary components. Operations 1300 may be indicative of operations occurring in a transmitting device, such as an AP for downlink transmissions or a UE for uplink transmissions.

In step 1310, a first data stream is modulated using a codebook to produce a second data stream. As described above, the codebook includes a plurality of codewords. Each codeword may eventually be mapped to a plurality of transmission resources in which N of the plurality of transmission resources, $N \geq 2$, are each encoded with a non-zero value and a remainder of the plurality of transmission resources are each assigned a zero value. Each codeword represents a constellation point of an N-dimensional complex constellation in which real and imaginary components of the constellation point are independent of one another. Each of the N non-zero values of a respective codeword includes a projection on one of N complex constellations, the N complex constellations representative of the N-dimensional complex constellation. The number of possible projections on the N complex constellations may be less than a number of points of the N-dimensional complex constellation. A further step 1320 involves transmitting the second data stream.

Figure 14:
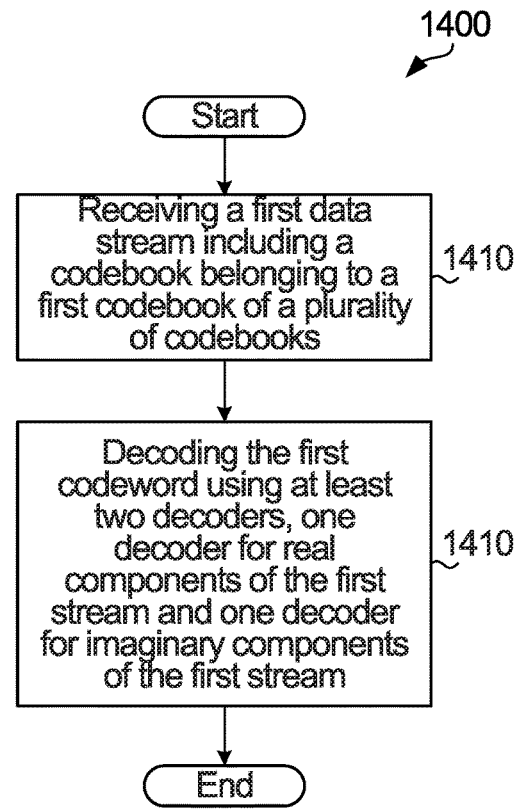
FIG. 14 illustrates a flow diagram for reception and decoding of according to example embodiments described herein.

FIG. 14 illustrates a flow diagram 1400 of a method occurring in the reception of data using codebook(s) derived from N-dimensional lattice constellations that map to an N-dimensional complex constellation in the form of N complex mother constellations having independent real and imaginary components. Operations 1400 may be indicative of operations occurring in a receiving device, such as an AP for uplink transmissions or a UE for downlink transmissions.

In step 1410, a first data stream is received including a first codeword belonging to a first codebook of a plurality of codebooks. Codewords are generated in a consistent manner as described above with reference to the transmitting method. A further step 1420 involves decoding the first codeword using at least two decoders, one decoder for real components of the first stream and one decoder for imaginary components of the first stream.

A method to generate SCMA codebooks from N-dimensional lattice constellations that map to an N-dimensional complex constellation in the form of N complex mother constellations having independent real and imaginary components is provided. The method includes generating multi-dimensional constellations such that real and imaginary components of an N-dimensional complex component are independent of one another. This may result at least in part from a layer specific signature that can be multiplied by one or more complex mother constellations to generate a layer specific codebook of codewords, wherein elements for permuting the N complex mother constellations have a same phase. The method includes appropriate labeling of constellation points. The method includes building SCMA codebooks based on the multi-dimensional constellations. The method may include a criterion for constellation generation with a smaller number of projections than points of the constellation per complex dimension, which may aid in reducing complexity at the receiver.

It is noted that in variations of embodiments of this application, the constellation or constellation map may also be referred to as a modulation map. So, the multi-dimension constellation may also be referred to as a multi-dimension modulation map. In accordance with embodiments of the application, multi-dimension may refers to two or more dimensions. The dimensions may refer to time and/or frequency dimensions and resource units therein, which are capable of transmitting independent symbols.

In various embodiments of the application, the codebook may also be referred as a spread constellation, a spread modulation map, or a spread modulation map. The spread constellation, spread modulation map, or spread modulation map may be achieved by applying a signature, which may also be called as spreading sequence, to a constellation. The codeword mentioned in embodiments of the application may also be called as spread constellation point.

In accordance with an embodiment of the application, in a SCMA system, the transmitter and the receiver need to use the same codebook for successive communication. There are several ways to ensure that the same codebook(s) are used at both the transmitter and the receiver.

In various embodiments, a procedure is used to make sure that the codebook used by the transmitter receiver pair is the same. Please note that these scenarios illustrate only some examples and do not preclude combination of these options together.

In one example embodiment, the network assigns the codebooks to the UEs in either or both directions (UL/DL) and informs the UE through high layer signaling. The assigned codebook may remain fixed or change over time/frequency. The high layer signaling may be Radio Resource Control signaling. The following example cases illustrate this.

Case 1: Fixed codebook. The codebook assigned to a UE remains fixed for the entire time/frequency and does not change until a subsequent high layer signaling.

Case 2: Rotation codebook. The UE receives an indication of a method of selecting the codebook based on the signaling combined with time/frequency index (such as adding the time to the codebook index, for example). Both network side device, such as a base station, and UE use the same method to ensure that the same codebook is used for transmission and reception.

Case 3: Pseudo random selection. The UE receives a random seed through higher layer signaling and uses an agreed upon random generator to determines the codebook to use in communications. The network also uses the same random generator and seed to remain synchronous with the UE and to ensure that both parties (the network and the UE) use the same codebook.

In another example embodiment, the UE selects a codebook in either downlink (DL) or uplink (UL) directions from the set of codebooks and informs the network through high layer signaling. The three cases mentioned above are also applicable in this example embodiment. There is a collision possibility in this example embodiment where the network and UE select different codebooks, which may be dealt with through the use of a collision resolution algorithm.

In another example embodiment, the network selects codebooks for the UE but does not inform the UEs which codebooks are used. The UEs use blind detection to determine layers and codebooks and find if any of those layers is (are) assigned to it.

In another example embodiment, the UE randomly selects one of the codebooks and the network blindly detects which codebooks are being used.

In another example embodiment, a method for grant based codebook assignment may be used. The grant in either UL/DL, may be on a physical control channel, carries information for the assigned codebook, which is determined dynamically by the network.

In another example embodiment, a method for grant based pseudo random codebook assignment may be used. The grant includes a seed or method for the UE to use to determine its assigned codebook in different time/frequency resources.

In another example embodiment, a method for UE identifier (ID) codebook assignment is disclosed. The UE may use its UE ID directly or combined with cell ID, and/or network ID, and/or time stamp, etc. to find which codebook is assigned to it. Such a method is also known by the network and an agreed set of codebooks is used by both sides.

In accordance with another embodiment of the disclosure, there is provided a non-transitory computer readable medium having computer executable instructions stored thereon for execution on a processor so as to implement any of the methods described herein. The non-transitory computer readable medium might for example be an optical disk such as a CD (Compact Disk), a DVD (Digital Video Disk), or a Blu-Ray Disk. Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

Numerous modifications and variations of the present disclosure are possible in light of the above teachings. It is therefore to be understood that within the scope of the appended claims, the disclosure may be practiced otherwise than as specifically described herein.

What is claimed is:

1. A method for transmission of a multiple access signal comprising:
   modulating a first data stream using a codebook to produce a second data stream, the codebook comprising a plurality of codewords,
   each codeword of the codebook configured to map a portion of the first data stream to a plurality of transmission resources in which N of the plurality of transmission resources, $N \geq 2$, are each encoded with a non-zero value and a remainder of the plurality of transmission resources are each assigned a zero value, and each codeword representing a constellation point of an N-dimensional complex constellation in which real and imaginary components of the constellation point are independent of one another, and transmitting the second data stream.

2. The method of claim 1, wherein each of the N non-zero values of a respective codeword comprises a projection on one of N complex constellations, the N complex constellations being an alternative representative of the N-dimensional complex constellation, in which a number of possible projections on the N complex constellations is less than a number of points of the N-dimensional complex constellation.

3. The method of claim 2, wherein the projection of each of the N complex constellations is mapped to an associated non-zero transmission resource using a signature specific to the first data stream.

4. The method of claim 3, wherein the signature has a same phase for mapping to all of the plurality of transmission resources.

5. The method of claim 4, wherein when multiple first data streams are each modulated with a codebook that is specific to a respective first data stream to produce the second data stream, each of the N non-zero transmission resources are mapped using a signature specific to the respective first data stream, wherein respective signatures for each of the first data streams have a same phase.

6. The method of claim 1, wherein each of the N complex constellations includes a plurality of projections, each projection defined by a complex plane coordinate pair having a real component coordinate and an imaginary component coordinate and having an associated label, the real component coordinate of a projection on an nth complex constellation, n=1 to N, is mapped from an nth axis component of a point on a first N-dimensional lattice constellation and the imaginary component coordinate of the projection on the nth complex constellation is mapped from an nth axis component of a point on a second N-dimensional lattice constellation, and the label of the projection of the nth complex constellation is a combination of a label of the point on the first N-dimensional lattice constellation and a label of the point on the second N-dimensional lattice constellation.

7. The method of claim 6, wherein the first and second N-dimensional lattice constellations are an output of unitary rotation performed on respective lattice constellations, the unitary rotation selected to reduce a number of constellation projections per dimension in the N-dimensional complex constellation.

8. The method of claim 6, wherein the first and second N-dimensional lattice constellations are an output for which no unitary rotation is performed.

9. The method of claim 1, wherein the codebook comprises a sparse code multiple access (SCMA) codebook.

10. The method of claim 1, wherein a number of points in the N-dimensional complex constellation is equal to or greater than 16.

11. The method of claim 10, wherein the number of points in the N-dimensional complex constellations is one of 16, 64, 256 or 1024.

12. The method of claim 1, wherein the codebook is used for downlink transmission.

13. The method of claim 1, wherein the first data stream comprises a stream of bits, and the second data stream comprises a stream of symbols.

14. The method of claim 1, wherein the modulating the first data stream using a codebook to produce the second data stream further comprises a layer specific signature applying a change of power level to values of the N non-zero transmission resources.

15. A device for transmitting a multiple access signal comprising:

a processor configured to:
modulate a first data stream using a codebook to produce a second data stream, the codebook comprising a plurality of codewords, each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value, and each codeword representing a constellation point of an N-dimensional complex constellation in which real and imaginary components of the constellation point are independent of one another, and a transmitter, operatively coupled to the processor, configured to transmit the second data stream over allocated resources.

16. The device of claim 15, wherein each of the N non-zero values of a respective codeword comprises a projection on one of N complex constellations, the N complex constellations being an alternative representative of the N-dimensional complex constellation, in which a number of possible projections on the N complex constellations is less than a number of points of the N-dimensional complex constellation.

17. The device of claim 15, wherein a projection of each N complex constellation is mapped to an associated non-zero transmission resource using a signature specific to the first data stream.

18. The device of claim 17, wherein the signature has a same phase for mapping to all of the plurality of transmission resources.

19. The device of claim 18, wherein when multiple first data streams are each modulated with a codebook that is specific to a respective first data stream to produce the second data stream, each of the N non-zero transmission resources are mapped to using a signature specific to the respective first data stream, wherein respective signatures for each of the first data streams have a same phase.

20. The device of claim 15, wherein each of the N complex constellations includes a plurality of projections, each projection defined by a complex plane coordinate pair, having a real component coordinate and an imaginary component coordinate and having an associated label, the real component coordinate of a point on an nth complex mother constellation, n=1 to N, is mapped from an nth axis component of a point on a first N-dimensional lattice constellation and the imaginary component coordinate of the projection on the nth complex mother constellation is mapped from an nth axis component of a point on a second N-dimensional lattice constellation, and the label of the projection of the nth complex mother constellation is a combination of a label of the point on the first N-dimensional lattice constellation and a label of the point on the second N-dimensional lattice constellation.

21. The device of claim 15, wherein the codebook is used for downlink transmission.

22. The device of claim 15, wherein the modulate the first data stream using a codebook to produce the second data stream further comprises a layer specific signature applying a change of power level to values of the N non-zero transmission resources.

23. The device of claim 15 further comprising a computer readable medium for storing one or more of one or more codebooks, one or more complex mother constellations and one or more layer specific signatures.

24. The device of claim 15, where the processor is configured to generate one or more codebooks.

25. A method for receiving a multiple access signal, the method comprising:
    receiving a first data stream comprising a first codeword belonging to a first codebook of a plurality of codebooks,
        each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value,
        each codeword representing a constellation point of an N-dimensional complex constellation in which real and imaginary components of the constellation point are independent of one another, and
    decoding the first codeword using two message passing algorithm (MPA) decoders and a forward error correcting (FEC) decoder, one MPA decoder for soft-decoding real components of the N complex constellations and one MPA decoder for soft-decoding imaginary components of the N complex constellations, the two MPA decoders providing soft-decoded outputs to the FEC decoder to decode the first data stream.

26. The method of claim 25, wherein each of the N non-zero values of a respective codeword comprises a projection on one of N complex constellations, the N complex constellations being an alternative representative of the N-dimensional complex constellation, in which a number of possible projections on the N complex constellations is less than a number of points of the N-dimensional complex constellation.

27. The method of claim 25 further comprising compensating for effects of a channel by applying a conjugate of an estimate channel gain to the first data stream.

28. A receiving device comprising:
    a receiver, operatively coupled to a processor, the receiver configured to receive a first data stream over allocated resources in a communication system; and
    the processor configured to:
        decode a first codeword within the first data stream, the first codeword belonging to a first codebook of a plurality of codebooks,
            each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value,
            each codeword representing a constellation point of an N-dimensional complex constellation in which real and imaginary components of the constellation point are independent of one another, and
            each of the N non-zero values of a respective codeword comprising a projection on one of N complex constellations, the N complex constellations representative of the N-dimensional complex constellation, in which a number of the projections on the N complex constellations is less than a number of points of the N-dimensional complex constellation.

29. The receiving device of claim 28, wherein the processor is configured to decode the first codeword using two message passing algorithm (MPA) decoders and a forward error correcting (FEC) decoder, one MPA decoder for soft-decoding real components of the N complex constellations and one MPA decoder for soft-decoding imaginary components of the N complex constellations, the two MPA decoders configured to provide soft-decoded outputs to the FEC decoder to decode the first data stream.

30. A method for transmission of a multiple access signal comprising:
    modulating a first data stream using a codebook to produce a second data stream, the codebook comprising a plurality of codewords,
        each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value, and
        each codeword representing a constellation point of an N-dimensional complex constellation,
        each of the N non-zero values of a respective codeword comprising a projection on one of N complex constellations, the N complex constellations being an alternative representative of the N-dimensional complex constellation, in which a number of possible projections on the N complex constellations is less than a number of points of the N-dimensional complex constellation; and
    transmitting the second data stream.

31. The method of claim 30, wherein real and imaginary components of the constellation point of the N-dimensional complex constellation are independent of one another.

32. The method of claim 30, wherein the projection of each of the N complex constellations is mapped to an associated non-zero transmission resource using a signature specific to the first data stream.

33. The method of claim 32, wherein the signature has a same phase for mapping to all of the plurality of transmission resources.

34. The method of claim 33, wherein when multiple first data streams are each modulated with a codebook that is specific to a respective first data stream to produce a second data stream, each of the N non-zero transmission resources are mapped to using a signature specific to the respective first data stream, wherein respective signatures for each of the first data streams have a same phase.

35. The method of claim 30, wherein each of the N complex constellations includes a plurality of projections, each projection defined by a complex plane coordinate pair having a real component coordinate and an imaginary component coordinate and having an associated label, the real component coordinate of a projection on an nth complex constellation, n=1 to N, is mapped from an nth axis component of a point on a first N-dimensional lattice constellation and the imaginary component coordinate of the projection on the nth complex constellation is mapped from an nth axis component of a point on a second N-dimensional lattice constellation, and the label of the projection of the nth complex constellation is a combination of a label of the point on the first N-dimensional lattice constellation and a label of the point on the second N-dimensional lattice constellation.

36. The method of claim 35, wherein the first and second N-dimensional lattice constellations are an output of unitary rotation performed on respective lattice constellations, the unitary rotation selected to reduce a number of constellation projections per dimension in the N-dimensional complex constellation.

37. The method of claim 36, wherein the first and second N-dimensional lattice constellations are an output for which no unitary rotation is performed.

38. The method of claim 30, wherein the codebook comprises a sparse code multiple access (SCMA) codebook.

39. The method of claim 30, wherein the number of points in the N-dimensional complex constellation is equal to or greater than 16.

40. The method of claim 39, wherein the number of points in the N-dimensional complex constellations is one of 16, 64, 256 or 1024.

41. The method of claim 30, wherein the codebook is used for downlink transmission.

42. The method of claim 30, wherein the first data stream comprises a stream of bits, and the second data stream comprises a stream of symbols.

43. The method of claim 30, wherein the modulating the first data stream using a codebook to produce the second data stream further comprises a layer specific signature applying a change of power level to values of the N non-zero transmission resources.

44. A method for transmission of a multiple access signal comprising:
  modulating a first data stream using a codebook to produce a second data stream, the codebook comprising a plurality of codewords,
    each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value, and
    each codeword representing a constellation point of an N-dimensional complex constellation,
    when multiple first data streams are each modulated with a codebook that is specific to a respective first data stream to produce a second data stream, each of the N non-zero transmission resources are mapped to using a signature specific to the respective first data stream, wherein respective signatures for each of the first data streams have a same phase; and
  transmitting the second data stream.

45. The method of claim 44, wherein real and imaginary components of the constellation point of the N-dimensional complex constellation are independent of one another.

46. The method of claim 44, wherein each of the N non-zero values of a respective codeword comprise a projection on one of N complex constellations, the N complex constellations being an alternative representative of the N-dimensional complex constellation, in which a number of possible projections on the N complex constellations is less than a number of points of the N-dimensional complex constellation.

47. The method of claim 46, wherein the projection of each of the N complex constellations is mapped to an associated non-zero transmission resource using a signature specific to the first data stream.

48. The method of claim 44, wherein each of the N complex constellations includes a plurality of projections, each projection defined by a complex plane coordinate pair having a real component coordinate and an imaginary component coordinate and having an associated label, the real component coordinate of a projection on an nth complex constellation, n=1 to N, is mapped from an nth axis component of a point on a first N-dimensional lattice constellation and the imaginary component coordinate of the projection on the nth complex constellation is mapped from an nth axis component of a point on a second N-dimensional lattice constellation, and the label of the projection of the nth complex constellation is a combination of a label of the point on the first N-dimensional lattice constellation and a label of the point on the second N-dimensional lattice constellation.

49. The method of claim 48, wherein the first and second N-dimensional lattice constellations are an output of unitary rotation performed on respective lattice constellations, the unitary rotation selected to reduce a number of constellation projections per dimension in the N-dimensional complex constellation.

50. The method of claim 49, wherein the first and second N-dimensional lattice constellations are an output for which no unitary rotation is performed.

51. The method of claim 44, wherein the codebook comprises a sparse code multiple access (SCMA) codebook.

52. The method of claim 44, wherein a number of points in the N-dimensional complex constellation is equal to or greater than 16.

53. The method of claim 52, wherein the number of points in the N-dimensional complex constellations is one of 16, 64, 256 or 1024.

54. The method of claim 44, wherein the codebook is used for downlink transmission.

55. The method of claim 44, wherein the first data stream comprises a stream of bits, and the second data stream comprises a stream of symbols.

56. The method of claim 44, wherein the modulating the first data stream using a codebook to produce the second data stream further comprises a layer specific signature applying a change of power level to values of the N non-zero transmission resources.

57. A method for transmission of a multiple access signal comprising:
  modulating a first data stream using a codebook to produce a second data stream, the codebook comprising a plurality of codewords,
    each codeword of the codebook configured to map a portion of the first data stream to a plurality of transmission resources in which N of the plurality of transmission resources, N≥2, are each encoded with a non-zero value and a remainder of the plurality of transmission resources are each assigned a zero value, and
    each codeword representing a constellation point of an N-dimensional complex constellation, the constellation point of the N-dimensional complex constellation being equivalent to points of N QAM constellations mapped independently to the N non-zero transmission resources.

* * * * *